United States Patent
Platon

(10) Patent No.: US 8,358,046 B2
(45) Date of Patent: Jan. 22, 2013

(54) HYBRID ELECTRIC POWER SYSTEM WITH DISTRIBUTED SEGMENTED GENERATOR/MOTOR

(76) Inventor: Mihai C. Platon, Burnaby (CA)

( * ) Notice: Subject to any disclaimer, the term of this patent is extended or adjusted under 35 U.S.C. 154(b) by 312 days.

(21) Appl. No.: 12/810,847

(22) PCT Filed: Dec. 19, 2008

(86) PCT No.: PCT/CA2008/002173
§ 371 (c)(1), (2), (4) Date: Jun. 27, 2010

(87) PCT Pub. No.: WO2009/082808
PCT Pub. Date: Jul. 9, 2009

(65) Prior Publication Data
US 2010/0285702 A1    Nov. 11, 2010

Related U.S. Application Data

(60) Provisional application No. 61/009,469, filed on Dec. 28, 2007.

(51) Int. Cl.
H02K 21/12 (2006.01)
H02K 1/22 (2006.01)
H02K 1/04 (2006.01)

(52) U.S. Cl. .......... 310/266; 310/114; 310/87; 310/112; 310/126; 310/118; 310/268

(58) Field of Classification Search .......... 310/266, 310/268, 102, 216.109, 87, 112, 126, 118; H02K 1/22, 1/04, 21/12
See application file for complete search history.

(56) References Cited

U.S. PATENT DOCUMENTS

| | | | |
|---|---|---|---|
| 2,650,992 A * | 9/1953 | Forss et al. | 310/216.131 |
| 3,922,574 A | 11/1975 | Whiteley | |
| 4,464,592 A | 8/1984 | Major | |
| 4,951,769 A | 8/1990 | Kawamura | |
| 5,111,098 A * | 5/1992 | Peck et al. | 310/268 |
| 5,477,091 A | 12/1995 | Fiorina et al. | |
| 5,589,743 A | 12/1996 | King | |
| 5,621,304 A | 4/1997 | Kiuchi et al. | |
| 5,637,941 A | 6/1997 | Paweletz | |

(Continued)

FOREIGN PATENT DOCUMENTS

EP    1703622 A1    9/2006
WO    WO2006093515 A2    9/2006

(Continued)

OTHER PUBLICATIONS

USPTO, Office Action U.S. Appl. No. 12/376,282, Sep. 22, 2010, 10 pages.

(Continued)

Primary Examiner — Quyen Leung
Assistant Examiner — Terrance Kenerly

(57) ABSTRACT

An apparatus is disclosed for a hybrid electric power system for use in a multi-wheeled hybrid electric vehicle, and particularly for use in hybrid electric vehicles designed for operation in hostile environments where reliability and survivability of the propulsion system of the vehicle are important. The hybrid electric power system advantageously comprises at least one segmented electrical machine having multiple pairs of parallel stator segments with a magnetic rotor segment between each pair, for generating power from a thermodynamic engine, or for providing power to a driven wheel of the hybrid electric vehicle. A hybrid electric power system is also provided which comprises at least one distributed segmented electrical machine which comprises a distributed electrical energy storage system.

20 Claims, 12 Drawing Sheets

U.S. PATENT DOCUMENTS

| | | |
|---|---|---|
| 5,656,921 A | 8/1997 | Farrall |
| 5,731,647 A | 3/1998 | Schuller et al. |
| 5,789,877 A | 8/1998 | Yamada et al. |
| 5,791,426 A | 8/1998 | Yamada et al. |
| 5,804,934 A | 9/1998 | Yamada et al. |
| 5,828,554 A | 10/1998 | Donegan et al. |
| 5,873,801 A | 2/1999 | Taga et al. |
| 5,903,112 A | 5/1999 | Yamada et al. |
| 5,903,113 A | 5/1999 | Yamada et al. |
| 5,905,346 A | 5/1999 | Yamada et al. |
| 5,909,094 A | 6/1999 | Yamada et al. |
| 5,920,160 A | 7/1999 | Yamada et al. |
| 5,936,312 A | 8/1999 | Yamada et al. |
| 5,942,862 A | 8/1999 | Yamada et al. |
| 5,973,460 A | 10/1999 | Taga et al. |
| 5,982,070 A | 11/1999 | Caamano |
| 5,988,307 A | 11/1999 | Yamada et al. |
| 6,009,365 A | 12/1999 | Takahara et al. |
| 6,019,698 A | 2/2000 | Lawrie et al. |
| 6,049,188 A | 4/2000 | Smith |
| 6,069,421 A * | 5/2000 | Smith et al. ............... 310/43 |
| 6,087,734 A | 7/2000 | Maeda et al. |
| 6,306,056 B1 | 10/2001 | Moore |
| 6,336,889 B1 | 1/2002 | Oba et al. |
| 6,405,701 B1 | 6/2002 | Masberg et al. |
| 6,648,086 B1 | 11/2003 | Schulte |
| 6,683,389 B2 | 1/2004 | Geis |
| 6,692,405 B2 | 2/2004 | Minowa et al. |
| 6,784,565 B2 | 8/2004 | Wall et al. |
| 6,877,576 B2 | 4/2005 | Schmitz et al. |
| 6,889,645 B2 | 5/2005 | Tumback et al. |
| 6,919,654 B2 | 7/2005 | Harned et al. |
| RE38,790 E | 9/2005 | Maeda et al. |
| 7,017,542 B2 | 3/2006 | Schmitz et al. |
| 7,042,109 B2 | 5/2006 | Gabrys |
| 7,104,347 B2 | 9/2006 | Severinsky et al. |
| 7,104,921 B2 | 9/2006 | Shimizu |
| 7,121,234 B2 | 10/2006 | Schmitz et al. |
| 7,148,649 B2 | 12/2006 | Ganev |
| 7,237,634 B2 | 7/2007 | Severinsky et al. |
| 7,240,751 B2 | 7/2007 | Hoare et al. |
| 7,800,276 B2 * | 9/2010 | Purvines ............... 310/266 |
| 7,839,049 B2 * | 11/2010 | Jansen et al. ............... 310/266 |
| 2002/0070557 A1 | 6/2002 | Geis |
| 2002/0190695 A1 | 12/2002 | Wall et al. |
| 2005/0179264 A1 | 8/2005 | Ganev |
| 2005/0252214 A1 * | 11/2005 | Goldmeer et al. ............ 60/698 |
| 2006/0106524 A1 * | 5/2006 | Schmitz et al. ............ 701/112 |
| 2006/0237247 A1 * | 10/2006 | Severinsky et al. ........ 180/65.4 |
| 2007/0024144 A1 * | 2/2007 | Obidniak ............... 310/156.36 |
| 2010/0007225 A1 * | 1/2010 | Platon et al. ............... 310/45 |

FOREIGN PATENT DOCUMENTS

WO    WO2007001340 A2    1/2007

OTHER PUBLICATIONS

SLO, Response, U.S. Appl. No. 12/376,282, Oct. 19, 2010, 2 pages.
USPTO, Office Action, U.S. Appl. No. 12/376,282, Dec. 6, 2010, 14 pages.
SLO, Response, U.S. Appl. No. 12/376,282, Apr. 6, 2011, 13 pages.
USPTO, Office Action, U.S. Appl. No. 12/376,282, Apr. 28, 2011, 18 pages.
WIPO, "PCT WO 2008/014584 International Search Report", 4 pages, May 1, 2007.
USPTO, Office Action, U.S. Appl. No. 12/376,282, filed Aug. 10, 2011, 17 pages.

* cited by examiner

HYBRID ELECTRIC POWER SYSTEM WITH DISTRIBUTED SEGMENTED GENERATOR/MOTOR

RELATED APPLICATIONS

The present application is a national phase entry of PCT International Patent Application No. PCT/CA2008/002173 filed on Dec. 19, 2008 and published as WO 2009/082808A1 and which claims priority to U.S. Provisional Patent Application Ser. No. 61/009,469 which was filed on Dec. 28, 2007, the contents of both of which are herein incorporated by reference.

TECHNICAL FIELD

The present invention relates generally to hybrid electric vehicles and power systems therefor. More specifically, hybrid electric vehicle power systems providing for improved reliability are disclosed.

BACKGROUND

Hybrid electric power systems have been developed to combine an internal combustion engine power system with an electric power system typically including a battery and an electric motor. Hybrid electric power systems have been applied to vehicles (known as hybrid electric vehicles or HEVs) to provide benefits such as improved fuel efficiency and lower exhaust emissions in comparison with conventional vehicles powered by internal combustion engine power sources alone.

Existing HEV systems vary in their configuration and the manner in which the internal combustion engine and electric power subsystems are combined to power the HEV. Existing HEV system configurations may be generally described as either parallel or series hybrid electric systems. In a parallel HEV system configuration, generally the internal combustion engine and electric power subsystems are combined so that the internal combustion engine is a primary source of torque to drive the wheels of the HEV.

Commonly, in a parallel hybrid electric system configuration, the internal combustion engine is a primary source of drive wheel torque, typically through a conventional or modified mechanical transmission means, whereas the electric power subsystem may be either a co-primary or a secondary source of torque to the drive wheels of the HEV. An example of a conventional parallel hybrid electric system configuration is disclosed in U.S. Pat. No. 5,789,877, the contents of which are herein incorporated by reference.

Alternatively, in a series HEV system configuration, generally the electric power subsystem and particularly the electric motor are the primary source of torque to drive the wheels of the HEV. In a series hybrid electric configuration, the internal combustion engine is typically used principally or solely to drive an electrical generator that supplies electrical energy to the battery and electric motor of the electrical power subsystem, and the electric motor is the primary or in some cases only power source to supply torque directly to the drive wheels of the HEV. Examples of conventional series hybrid electric system configuration is disclosed in U.S. Pat. No. 5,589,743, and in PCT patent publication No. WO 2006/093515, the contents of which are herein incorporated by reference.

HEVs employing a series hybrid electric power system configuration may provide certain advantages over parallel configurations for some types of HEVs. For example, an advantage of a series HEV configuration is that the internal combustion engine may be located anywhere in the vehicle because it is not necessary to align the engine with a mechanical drive train connected to the drive wheels of the HEV, since the internal combustion engine typically does not directly provide torque to the drive wheels. Another potential advantage of a series HEV configuration is that the internal combustion engine may be optimally configured to run at a relatively constant speed while driving an electrical generator, such that the efficiency of the engine is optimized, rather than requiring the engine to run at widely varying speeds to mechanically drive the wheels of the HEV. Particularly with diesel internal combustion engines, the fuel efficiency of the engine when optimized to run at a constant speed may be significantly increased relative to a similar engine run over a wide range of speeds corresponding to the driving cycle of a vehicle.

However, a potential disadvantage of series HEV system configurations is that the reliability of the entire drive train system for driving the wheels of the HEV is primarily or solely dependent on the reliability of the electric power subsystem, typically including a generator powered by the internal combustion engine, an energy storage system or battery, and a drive motor supplying torque to the drive wheels of the HEV. If the electric drive motor and/or battery fail, there is typically no source of torque to drive the wheels of the HEV, and if the electric generator fails, the drive motor can only drive the wheels of the HEV for as long as the electrical energy stored in the battery or other energy storage system is available. Additionally, in some parallel HEV system configurations including an electric motor which is a co-primary source of drive wheel torque, the reliability of the HEV system to drive the wheels of the HEV is at least partially reliant on the reliability of the electrical power subsystem, including the generator and electric drive motor. Therefore, the improvement and optimization of HEV drive systems, particularly series HEV systems, is dependent on the reliability of the electrical motor and generator components, indicating a need for HEV electrical systems with improved reliability.

Further, particularly for HEVs designed for use in harsh or dangerous environments, where reliability of the HEV is critical, and where potential for damage to the HEV electrical system components exists, HEV electrical systems with improved reliability, durability and survivability are needed. For example, for HEV systems designed for military or other conflict-related use where reliability is critical, the potential for damage to the HEV electrical power system components from wear and/or weapon-related causes indicates a need for HEV electrical systems with improved survivability, fault tolerance, and graceful degradation operating characteristics.

SUMMARY

It is an object of the present invention to provide a hybrid electric vehicle power system that addresses some of the limitations of the prior art.

Another object of the present invention is to provide a distributed segmented electrical machine, comprising a distributed electrical energy storage system that addresses some of the limitations of the prior art.

Yet a further object of the present invention is to provide a hybrid electric power system for powering a multi-wheeled hybrid electric vehicle that comprises:
 a thermodynamic engine powered by a fuel that is mechanically connected to drive a first electrical generator/motor;

a second electrical generator/motor adapted to drive at least one driven wheel of the hybrid electric vehicle; and at least one electrical energy storage system operable to store electrical energy generated by at least one of said first or second electrical generator/motors;

wherein at least one of the first and second electrical generator/motors is a segmented electrical generator/motor that comprises:

(a) a plurality of pairs of stator segments that each comprise first and second stator segments, each stator segment of each pair comprising at least one stator winding; and (b) a rotor segment that comprises at least one magnet;

wherein each of the pairs of stator segments are physically separate from and substantially magnetically decoupled from each other pair of stator segments.

Another object of the present invention is to provide a hybrid electric power system as described immediately above, where each of the stator segment pairs are substantially parallel and spaced apart, and having a rotor segment slidably coupled between the first and second stator segments of each pair.

A further object is to provide a hybrid electric power system as described above having at least one segmented electrical generator/motor that is a distributed segmented electrical generator/motor that additionally comprises:

(a) a plurality of stator segment groups, each of which comprises one or more interconnected pairs of stator segments; and (b) a plurality of electrical energy storage systems, each of which is electrically connected to a corresponding stator segment group and is operable to store electrical energy generated by the corresponding stator segment group.

Yet another object of the present invention is to provide a hybrid electric power system as described above for powering a marine hybrid electric vehicle comprising at least one water propulsion means.

Further advantages of the invention will become apparent when considering the drawings in conjunction with the detailed description.

BRIEF DESCRIPTION OF THE DRAWINGS

The apparatus and method of the present invention will now be described with reference to the accompanying drawing figures, in which.

DETAILED DESCRIPTION

Figure 1:
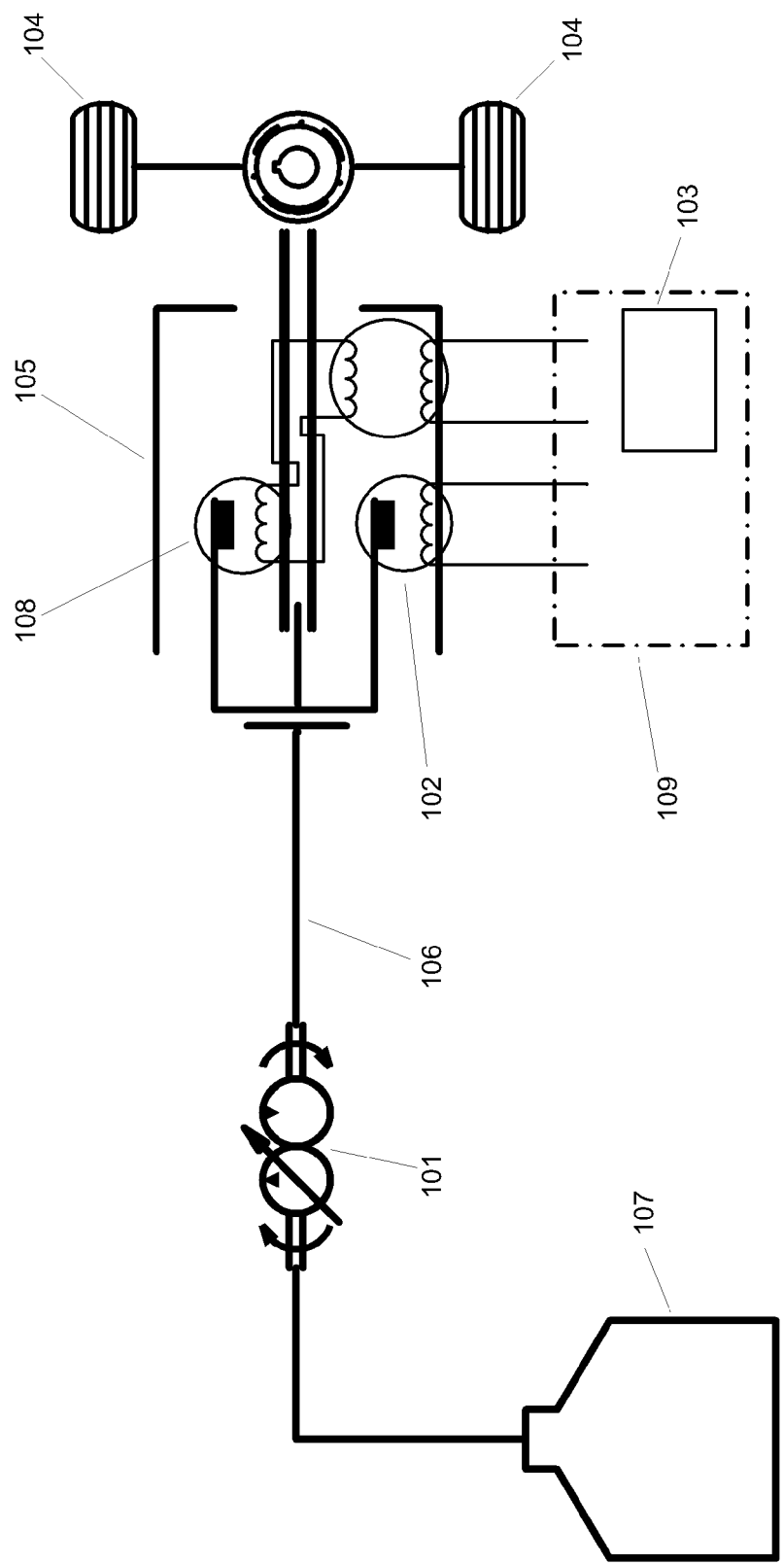
FIG. 1 is a schematic representation of a parallel HEV system configuration according to the prior art.

Referring to FIG. 1, a schematic view of a conventional parallel hybrid electric vehicle power system according to the prior art is shown for reference purposes. The conventional parallel hybrid power system comprises an internal combustion engine (ICE) 101 and electric motors 102 and 108, which together are connected to driven wheels 104 of the HEV. The ICE 101 is powered by combustion of a fuel from fuel source 107, and is connected to transmission unit 105 by means of crankshaft 106, which transmits power from the ICE 101 to the transmission unit 105. The transmission unit 105 includes a first clutch electric motor 108 and a second assist electric motor 102, which are configured to operate either as electric drive motors, or as electric generators as needed to add or extract power from the drive train of the HEV.

The transmission unit 105 is mechanically connected to the driven wheels 104 of the HEV, and is operable to transmit torque from one or more of the ICE, clutch motor 108 and assist motor 102 to the driven wheels 104. Alternatively, the transmission unit 105 may transfer torque from the driven wheels 104 to one or both of the clutch motor 108 and assist motor 102, which may act as electrical generators, for conversion to electrical energy (known as regenerative braking). Electrical energy generated by either of motor/generators 102 and 108 from regenerative braking, or from conversion of torque from the ICE 101 into electrical energy, may be stored in battery 103. Electrical energy generated by either of motor/generators 102 and 108 may be converted for storage in battery 103 by electric power driver 109, which may include one or more common electrical power conversion components such as inverters, rectifiers, diode bridges, etc. Battery 103 also provides electrical power to motors 102 and 108 to add power (torque) to the drive train of the HEV.

The operation of the ICE 101, electrical motor/generators 102 and 108, battery (or other electrical energy storage means) 103, electric power driver 109, and transmission unit 105 may typically be controlled by a central electronic control system (not shown). Such electronic control system may typically be programmed to control all power-related functions of the HEV to facilitate all normal operations of the vehicle.

In the case of the conventional parallel HEV power system disclosed in the prior art and illustrated in FIG. 1, the operation of the electrical power subsystem, comprising the two electric motor/generators 108 and 102, the battery 103, and the electric power driver 109, may not typically be critical to provide propulsion to the driven wheels 104 of the HEV. In the case of a fault or failure of the electrical power subsystem or a component thereof, the ICE may typically still be able to directly provide torque to the driven wheels 104 of the HEV, through mechanical drive components including the crankshaft 106 and transmission unit 105, maintaining propulsion of the HEV. However, it may be appreciated that if the electrical power subsystem is incapacitated (such as by fault or failure), in some cases, at least some degree of desired propulsion performance of the HEV may be undesirably compromised due to the loss of propulsive power of one or both of the electrical motors.

Figure 2:
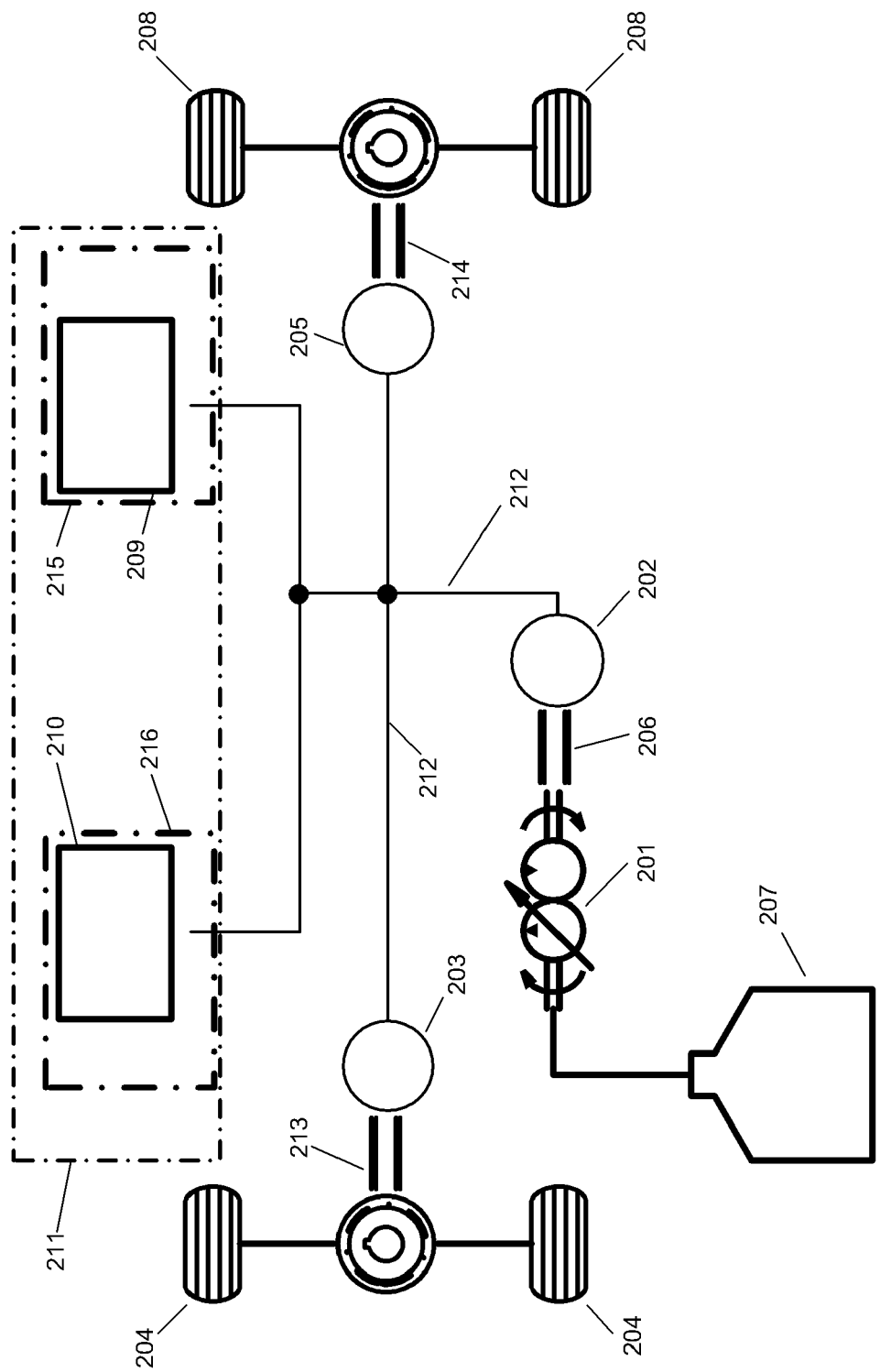
FIG. 2 is a schematic representation of a series HEV system configuration according to an embodiment of the invention.

Referring now to FIG. 2, a schematic representation of a series HEV power system configuration according to an embodiment of the invention is shown. The power system comprises a thermodynamic engine powered by a fuel, such as exemplary internal combustion engine 201 which is powered by fuel from a fuel storage tank 207, which is mechanically connected to and drives a segmented electrical generator/motor machine 202 to produce electrical energy, such as by a drive shaft 206. The segmented electrical generator/motor 202 is electrically connected to one or more segmented electrical motor/generator machines 203 and 205 by means of electrical power conduits 212. Segmented electrical machines 203 and 205 are mechanically connected to driven wheels 204 and 208 respectively, to provide torque to the driven wheels to propel the HEV. Such mechanical connection of segmented electrical machines 203 and 205 to the driven wheels 204 and 208 respectively may comprise drive shafts 213 and 214, or other suitable transmission means.

Segmented electrical machines 202, 203 and 205 are also connected to electrical energy storage system 211 by means of electrical power conduits 212, to store electrical energy generated by the segmented electrical machines. The electrical energy storage system 211 may preferably comprise one or more energy storage means such as batteries 209 and 210. Energy storage system 211 may also comprise at least one electrical power driver system to convert electrical energy generated by segmented electrical machines 202, 203 or 205 as necessary for storage in the energy storage means. Electrical energy storage system 211 may comprise a single such electrical power driver means to convert generated energy for storage in multiple energy storage means in system 211, or alternatively, as shown in FIG. 2, each energy storage means such as batteries 209 and 210 may comprise its own dedicated electrical power driver such as power drivers 215 and 216 respectively. Electrical power drivers 215 and 216 may comprise any suitable power conversion electronics such as rectifiers, inverters and diode bridges for example, for reversible conversion of generated electrical energy for storage, and may be controlled (such as by microprocessor or programmable microcontroller) or uncontrolled. In alternative embodiments, energy storage means may include any suitable means for reversibly storing electrical energy, such as rechargeable batteries of any known type such as lead acid, nickel metal hydride, lithium ion or polymer, for example, or capacitive storage means such as ultracapacitors, or combinations thereof, such as lithium ion batteries and ultracapacitors, for example.

In a series HEV power system configuration, such as the inventive configuration shown in FIG. 2, the propulsion of the HEV is dependent upon the reliability of the electrical power subsystem, as the ICE 201 is not capable of propelling the HEV in the case of a complete electrical power subsystem failure. However, the inventive HEV electrical power system shown in FIG. 2, provides for desirably enhanced reliability through the use of segmented electrical machines 202, 203 and 205, arranged in such a way that multiple energy sources may be utilized to provide propulsion to multiple sets of driven wheels 204 and 208, to maintain mobility of the HEV. The fuel storage tank 207 and ICE 201, connected to segmented electrical machine 202 represent a first exemplary energy source, and batteries 209 and 210 represent additional exemplary energy sources, any one or combination of which may be utilized to propel the HEV by means of either of the driven wheels 204 or 208 which are independently powered by segmented electrical machines 203 and 205 respectively. Additionally, when the HEV is in motion, either of segmented electrical machines 203 and 205 may provide an additional energy source such as for storage in either of batteries 209 or 210 by generating electrical energy from driven wheels 204 or 208 respectively, by means of regenerative braking. Therefore, the inventive series HEV propulsion system of FIG. 2 may be tolerant of a fault in at least one of the energy sources recited above, or in at least one of the driven wheel and segmented electrical machine propulsion units, while still providing propulsion to the HEV. The increased reliability of the series hybrid arrangement of FIG. 2 may be particularly valuable in an HEV designed for use in military or other conflict environments, where the propulsion system of the HEV may be damaged by use in harsh environments, or weapon-related causes. Further, in the inventive series HEV configuration of FIG. 2, various components of the HEV power and propulsion system may be located in different locations in the HEV, increasing the reliability of the propulsion system to damage to a particular part of the vehicle, such as from a weapons hit. In some embodiments, electrical power or control conduits, such as power wires or control circuitry which may be critical to the operation of the HEV propulsion system may be provided in redundant configurations, such as parallel conduits or wires passing through different areas of the HEV, so that a fault or damage to one electrical conduit may be compensated by the functionality of a redundant conduit. Also, the distribution of components of the HEV power and propulsion system in different parts of the vehicle allows for distribution of the weight of such power and propulsion systems through different parts of the vehicle, which may be desirable to provide for optimization of dynamics of the HEV.

In addition, the segmented electrical machines 202, 203 and 205 provide enhanced reliability to the HEV configuration of FIG. 2. The segmented electrical machines 202, 203 and 205 preferably comprise a dual sided segmented stator, and a segmented rotor, wherein rotor segments pass between pairs of stator segments. Each stator segment in such a segmented electrical machine design may desirably comprise individual stator windings, such that a fault (such as open or short circuit winding faults for example) in one stator segment, or pair of stator segments, may be electrically and also substantially magnetically isolated from the remaining stator segments, and does not affect the function of the remaining stator segments. The segmented electrical machine's ability to continue to function, albeit at a proportionally decreased capacity, may also be referred to as graceful degradation. The segmented electrical machines 202, 203 and 205 implemented in the inventive HEV configuration of FIG. 2 may include either segmented induction or segmented permanent magnet based electrical machines, or combinations thereof and may be of synchronous or asynchronous, and AC or DC design. Such fault tolerant segmented stator configurations, and electrical machines comprising a dual sided segmented stator are described in the commonly owned PCT patent application No. PCT/CA2007/000181, the contents of which are herein incorporated by reference. Details of the construction and implementation of such segmented electrical machines comprising a dual sided segmented stator are described in additional detail below, in reference to FIGS. 10-12.

Figure 3:
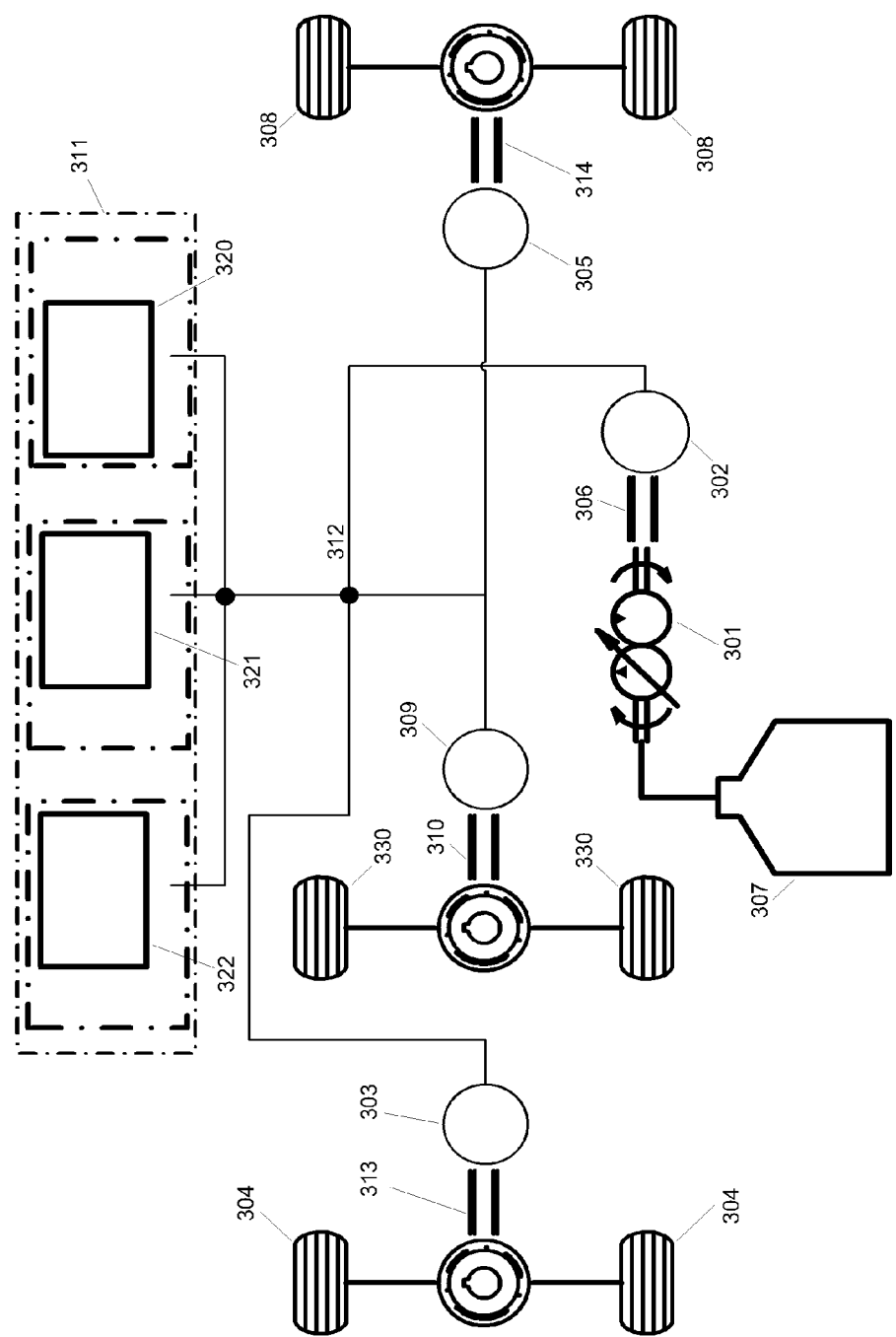
FIG. 3 is a schematic representation of another series HEV system configuration according to an embodiment of the invention.

Referring now to FIG. 3, a schematic representation of a further series HEV power system configuration according to an embodiment of the invention is shown. The series HEV system shown in FIG. 3 is similar to the HEV configuration shown in FIG. 2, but provides for propulsion of 3 sets of driven wheels, 304, 330 and 308, in an HEV having at least 3 axles, by means of three segmented electrical motor/generator machines 303, 309 and 305 respectively, which are connected to the driven wheels by drive shaft or other transmission means 313, 310 and 314, respectively. In alternative embodiments, such as for an HEV adapted for amphibious applications, at least one of the electrical machines 303, 309 and 305 may also be selectively connected to amphibious propulsion means, such as a propeller or waterjet propulsion means for providing amphibious propulsion of the HEV. The HEV system configuration of FIG. 3 also includes an energy storage system 311, similar to that of the system of FIG. 2. However the energy storage system 311 is shown with three exemplary batteries 320, 321, and 322 for storing electrical energy, to illustrate the flexibility of the series HEV system configurations according to the invention to integrate a multiplicity of individual energy sources such as multiple energy storage means and/or multiple segmented electrical generation machine sources interconnected electrically by electrical conduit means 312, to improve the reliability, fault tolerance and potential survivability of the HEV propulsion system. Additionally, in some embodiments, the energy storage system 311, or components thereof such as batteries 320-322 may be situated separately in a distributed fashion in different locations in the HEV, or may be armored or otherwise protected to increase reliability and survivability for HEVs adapted for military or other use in harsh environments.

In alternative inventive embodiments, the HEV power system according to the invention may be configured for application to marine hybrid electric vehicles, such as transport or military watercraft and military patrol boats in particular. In such alternative marine HEV embodiments, one or more water propulsion means are driven by the HEV power system in place of the driven wheels of the hybrid electric vehicle embodiments shown in FIGS. 2 and 3, and described above. Such water propulsion means for use in marine applications may include propellers, waterjet propulsion means, or fan propulsion means (in the case of a fan-driven airboat) for example. In such marine applications, water propulsion means are desirably powered by one or more segmented electrical machines, to provide increased reliability and survivability, such as may be required for marine HEVs adapted for military or other use in harsh environments. Similarly, the inventive HEV power system embodiments described below with reference to FIGS. 4-12 may also be applied to marine HEVs such as transport or military watercraft and military patrol boats in particular.

Figure 4:
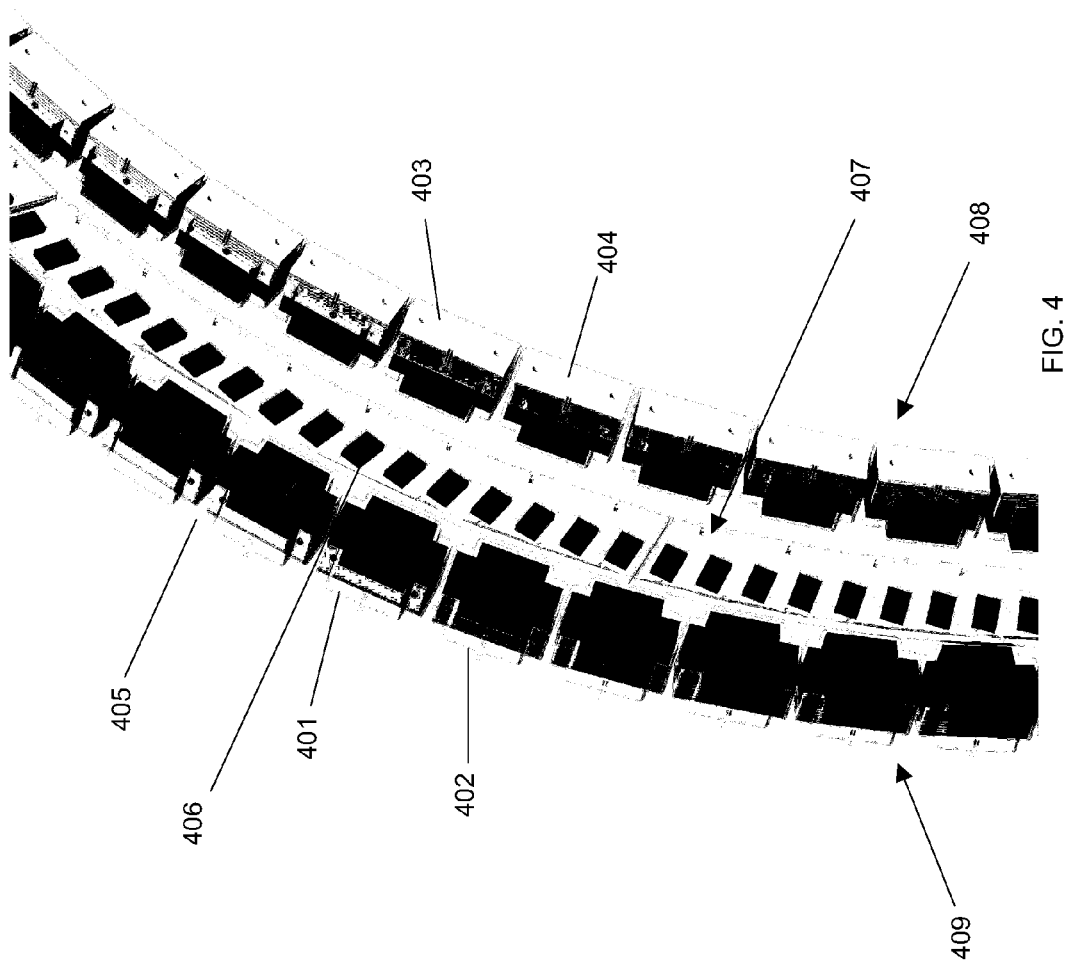
FIG. 4 is a partially exploded perspective view of segmented stator and rotor elements of a segmented electrical generator/motor machine for use in an HEV according to an embodiment of the invention.

Referring now to FIG. 4, a partially exploded perspective view of segmented stator and rotor elements of a segmented electrical generator/motor machine for use in an HEV according to an embodiment of the invention is shown. The exemplary segmented electrical machine of FIG. 4 is an example of a dual stator axial flux internal rotor permanent magnet machine, comprising dual segmented stators 408 and 409, with segmented rotor 407 passing axially therebetween. The segmented stators 408 and 409 may desirably comprise a plurality of pairs of opposing stator segments such as paired stator segments 401 and 403, and paired stator segments 402 and 404, for example. Each stator segment comprises one or more stator windings. The segmented rotor 407 comprises a plurality of rotor segments 406, which include permanent magnets in the exemplary segmented electrical machine of FIG. 4. In other embodiments, the rotor segments 406 of the segmented rotor 407 may comprise inductive elements, permanent magnet elements, or combinations thereof, for example. Therefore, the exemplary segmented electrical machine of FIG. 4 may advantageously function as an electrical generator when rotor 407 is caused to rotate, such as by connection to the drive shaft of an ICE in an HEV, resulting in the induction of electrical current in the stator windings of stator segments 401 and 402 for example. Alternatively, the exemplary segmented electrical machine of FIG. 4 may function as an electric motor when electric current is applied to the stator windings of stators 408 and 409, resulting in the rotation of segmented rotor 407, which may be connected to drive a mechanical load, such as one or more driven wheels of an HEV, for example.

The segmented use of segmented electrical machines, such as the exemplary segmented machine of FIG. 4, in the HEV embodiments of the invention offers substantial benefits to the reliability of the HEV system, relative to the use of conventional non-segmented electrical machines. In particular, segmented electrical machines such as shown in FIG. 4 may advantageously provide substantially fault tolerant operation, that is, a fault or failure in one part of the segmented electrical machine may be isolated from, and does not affect the continued operation of the remaining parts of the segmented electrical machine. Such desirable fault tolerance may be achieved in a segmented electrical machine design such as that of FIG. 4 due to the application of a modular segmented stator 409 comprising multiple individual stator segments 401, 402, which each comprise at least one individual stator winding. Individual stator segments 401, 402 may be desirably physically separated from adjacent stator segments by an intra-segment gap 405. Due to the fact that individual stator segments 401, 402 comprise individual stator windings, and are separated by gaps 405 within the segmented stator 409, each stator segment 401, 402 may be substantially decoupled electrically, magnetically, thermally and physically from other stator segments, such that a fault (such as an open or short circuit fault) or failure in one stator segment may not affect the performance of remaining stator segments in the segmented stator. In particular, in a dual segmented stator and single segmented rotor configuration such as shown in FIG. 4, the pairs of stator segments such as segments 401 and 403, are desirably operable to optimally focus, or confine, the magnetic flux density lines induced by a magnetic rotor segment 406 substantially within the pair of E-shaped stator segments 401 and 403, so that the pair of stator segments 401 and 403 are at least substantially magnetically decoupled from each other stator segment. Therefore, a segmented electrical machine comprising segmented stators, such as the machine shown in FIG. 4, applied in an HEV may provide substantially fault tolerant operation even if one or more parts of the machine may be damaged, leading to increased reliability and survivability of the propulsion system of an HEV according to embodiments of the invention. The ability of the segmented electrical machine of FIG. 4 to continue functioning (albeit at a proportionally decreased capacity) as one or more parts of the machine may be damaged or fail may also be referred to as graceful degradation.

The segmented design of the exemplary segmented electrical machine of FIG. 4 may provide further operational benefits for use in an HEV according to embodiments of the invention. The use of individual stator and rotor segments may allow for simplified maintenance, as damaged or worn stator and/or rotor segments may be replaced individually without requiring the replacement or repair of the entire stator and/or rotor, which may facilitate onsite or field maintenance of the segmented electrical machines in an HEV. Further, the physical separation of stator and rotor segments in some embodiments, such as by intra-segment gaps 405, provides improved cooling of the segmented electrical machine relative to a conventional machine using solid or unitary stators and/or rotors, as convection of air or other cooling fluids between the individual stator and/or rotor segments is facilitated. Also, the individual stator segments 401, 402, 403, 404 of the segmented stators 408, 409 may advantageously be electrically connected in any desired combination (such as parallel, series, or combinations thereof for example) to provide for input or output electrical phases or voltages to/from the segmented electrical machine, thus desirably providing flexibility in the electrical configuration of the machine such as for use in an HEV. In some embodiments, individual stator segments located across from each other on opposing stators 408 and 409, such as segments 401 and 403, for example, may be electrically connected to form an electrically connected stator pair. However, such an electrically connected stator pair may desirably remain substantially magnetically decoupled from adjacent stator segments or pairs, to desirably minimize the effect of a fault in an adjacent stator segment or pair on electrically connected segments 401 and 403.

Figure 5:
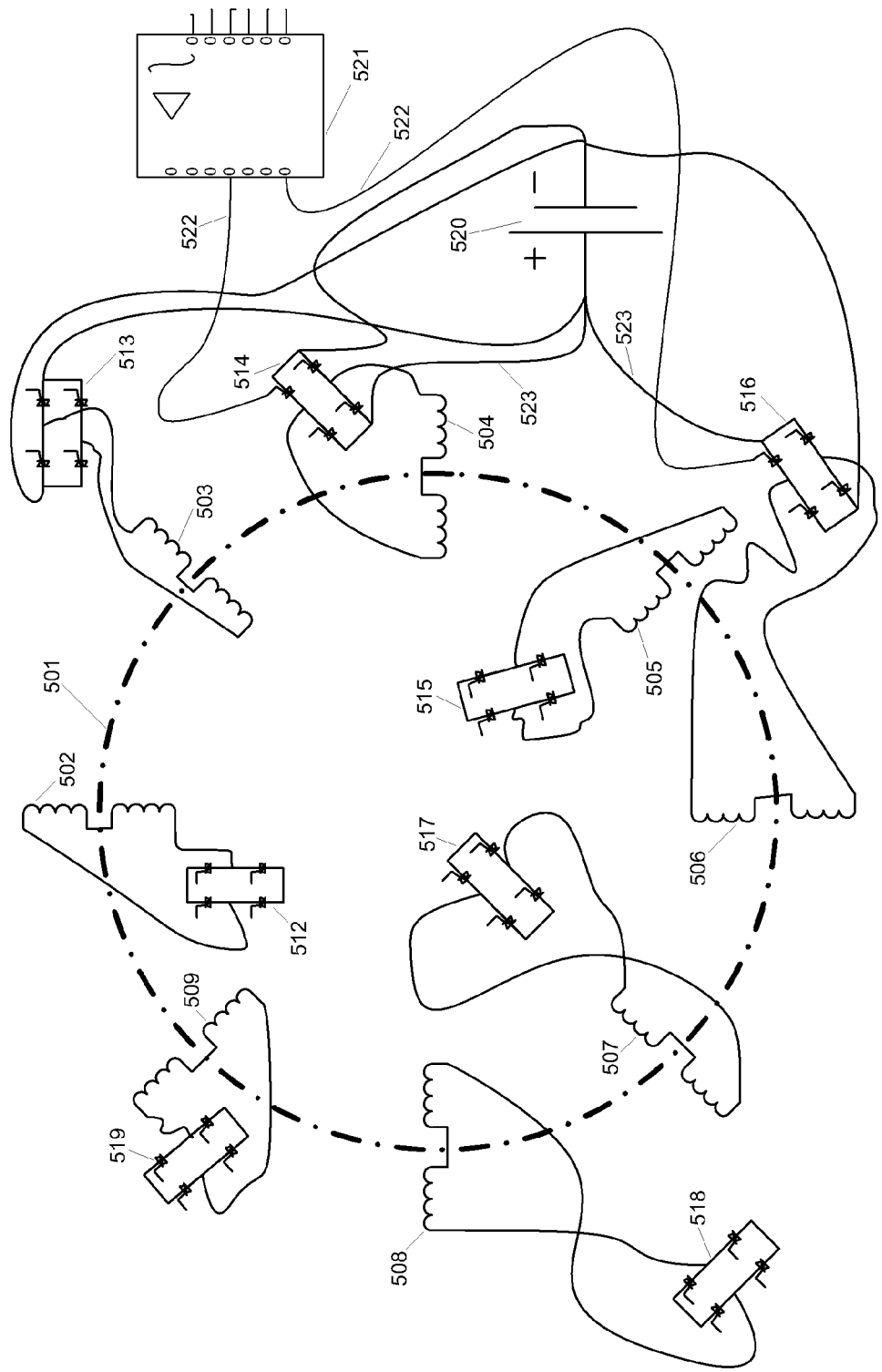
FIG. 5 is a schematic view of segmented stator and rotor elements of a segmented electrical generator/motor machine for use in an HEV according to an embodiment of the invention.

Referring now to FIG. 5, a schematic view of segmented stator and rotor elements of a segmented electrical generator/motor machine for use in an HEV according to an embodiment of the invention is shown. The rotor 501 of the exemplary segmented electrical machine of FIG. 5 is shown schematically passing between eight pairs of stator segments 502-509, which collectively form a dual segmented stator assembly. In the exemplary embodiment of FIG. 5, each of stator segment pairs 502-509 are preferably substantially magnetically decoupled from each other stator segment pair, and are shown connected to individual corresponding electrical power driver circuits 512-519, respectively. The electrical power driver circuits 512-519 are in turn all electrically connected to electric energy storage system 520 (which may comprise one or more batteries, ultracapacitors, or combinations thereof, for example) by means of electrical conduits 523 (only a portion of electrical conduits 523 are shown in FIG. 5 for clarity). The individual electrical power driver circuits 512-519 function to convert electrical energy from and/or to individual corresponding stator segments 502-509, as required for the transfer of electrical energy to/from energy storage system 520. The electrical power driver circuits 512-519 may comprise any suitable power conversion electronics, such as inverters, rectifiers, diode bridges, or combinations thereof, for example. A central control system 521 may be electrically connected by control circuits 522 to the power driver circuits 512-519 to control the conversion of electrical energy to and/or from the stator segments 502-509. Central control system 521 may comprise a microcontroller, programmable processor or other suitable electronic control means to control energy conversion by power driver circuits 512-519. In alternative embodiments, any suitable number of stator segments 502 and corresponding power driver circuits 512 may be used.

In the segmented electrical machine of FIG. 5, the distribution of power driver circuit functionality to multiple individual power driver circuits 512-519 physically located with corresponding individual stator segments 502-509 may desirably increase the reliability and fault tolerance of the segmented electrical machine. In this manner, a fault or damage to one stator segment or power driver circuit is isolated from and will not affect the operation of the remaining stator segments, and of the power conversion functionality of the remaining stator segments. By contrast, in existing single central power driver systems, any fault or damage to the single power driver system affects the power conversion functionality of the entire electrical machine. Therefore, the distribution of electrical power system functionality (such as power driver circuitry) in combination with the segmentation of the stator of an electrical machine according to an embodiment of the invention, desirably provide increased fault tolerance and reliability for application to an HEV electrical power system.

Figure 6:
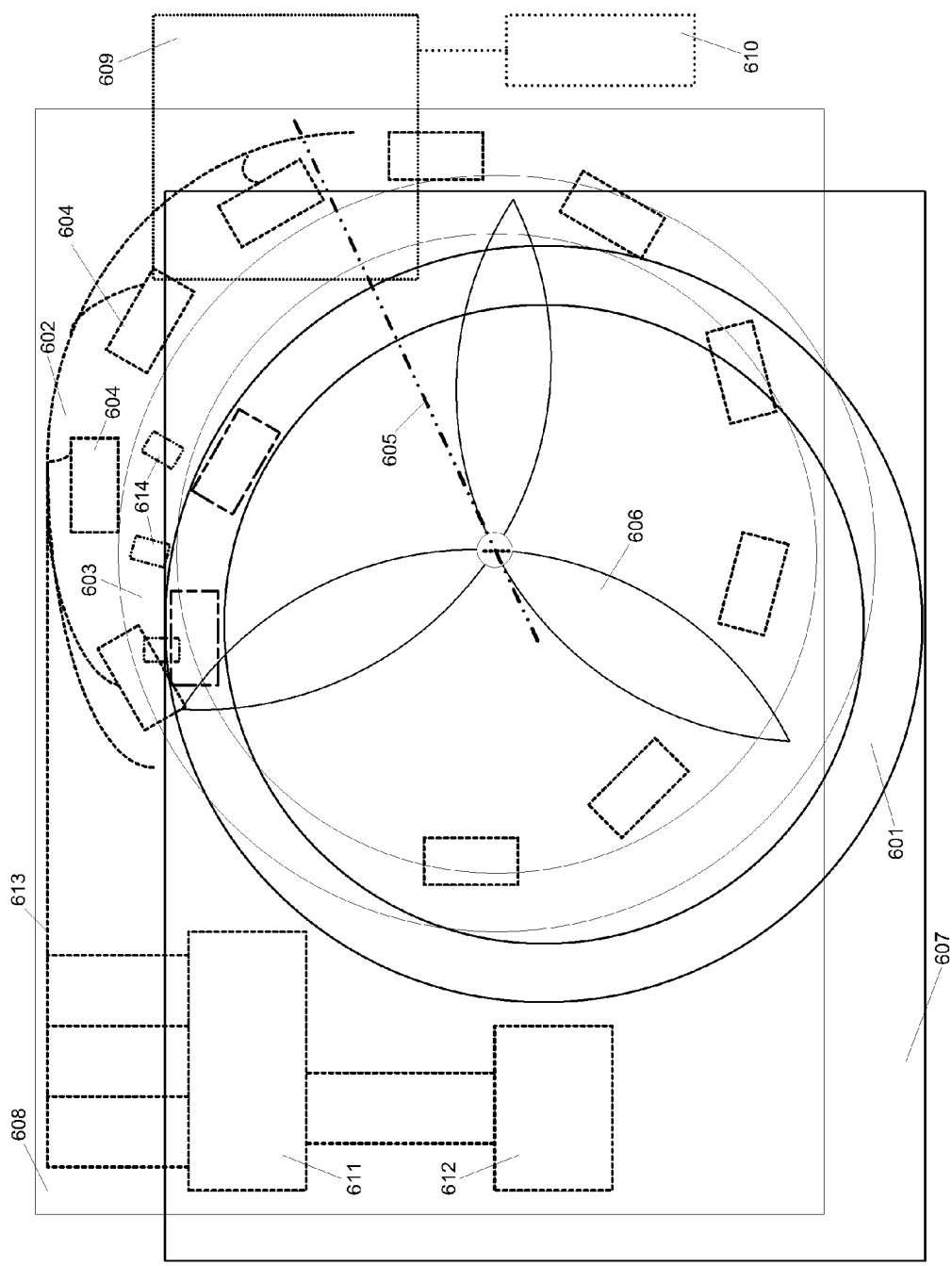
FIG. 6 is a perspective cross-sectional view of a segmented electrical generator/motor machine attached to an internal combustion engine according to an embodiment of the invention.

Referring now to FIG. 6, a perspective cross-sectional view of a segmented electrical generator/motor machine attached to an internal combustion engine according to an embodiment of the invention is shown. The exemplary segmented electrical machine of FIG. 6 comprises dual segmented stators 601 and 602, each comprising a plurality of individual stator segments 604. The segmented stators 601 and 602 and associated electrical power system components are inventively distributed in attachment to two structural plates 608 and 607, such that first segmented stator 601 and electronic control circuitry 612 are attached to first structural plate 607, and second segmented stator 602 and electrical power driver circuitry 611 are attached to second structural plate 608. The segmented rotor 603, located between segmented stators 601 and 602, and comprising rotor segments 614, may be mechanically attached to ICE 609 such as by means of crankshaft 605, such that the ICE may rotate segmented rotor 603. The control circuitry 612 functions to control the operation of the segmented electrical machine, and optionally also the ICE 609, and the electrical power driver circuitry 611 functions to convert electrical energy from segmented stators 601, 602, to useful electrical power, which may be exported from the segmented electrical machine by means of power conduit 613. The segmented electrical machine of FIG. 6 may therefore be adapted to function as an electrical generator for use in an HEV according to and embodiment of the invention, to convert mechanical energy from ICE 609, powered by fuel stored in fuel storage means 610, into electrical energy for storage in an energy storage means (not shown), or to power another electrical machine (not shown).

The inventive distributed arrangement of the components of segmented electrical machine of FIG. 6 on structural plates 607 and 608 may also desirably provide benefits in the reliability and fault tolerance of the segmented electrical machine. For example, the structural plates 607 and 608 may be comprised of a thermally conductive material, such that they act as cooling plates or heatsinks to absorb and dissipate heat generated by the segmented stators 601, 602, or power or control circuitry 611, 612 to avoid thermal damage. In one embodiment, the structural plates 607, 608, may conduct a coolant fluid, such as within internal passages between the surfaces of plates 607, 608, to form active cooling plates, thereby actively dissipating heat generated by the segmented stators 601, 602 and circuitry 611, 612. A fan 606 may also optionally be connected to the crankshaft 605 or rotor 603 to provide additional convective cooling for the segmented electrical machine. Further, the thermal and physical separation of segmented stators 601 and 602 by attachment to separate plates 607 and 608 respectively, provides additional fault tolerant functionality to the segmented machine of FIG. 6, as a thermal fault or damage to one segmented stator may be isolated from and not affect the second segmented stator. In the case where the segmented electrical machine of FIG. 6 is installed as a generator means in an HEV, additional fault tolerance of the segmented electrical machine may advantageously also provide improved reliability of the propulsion system of the HEV.

Figure 7:
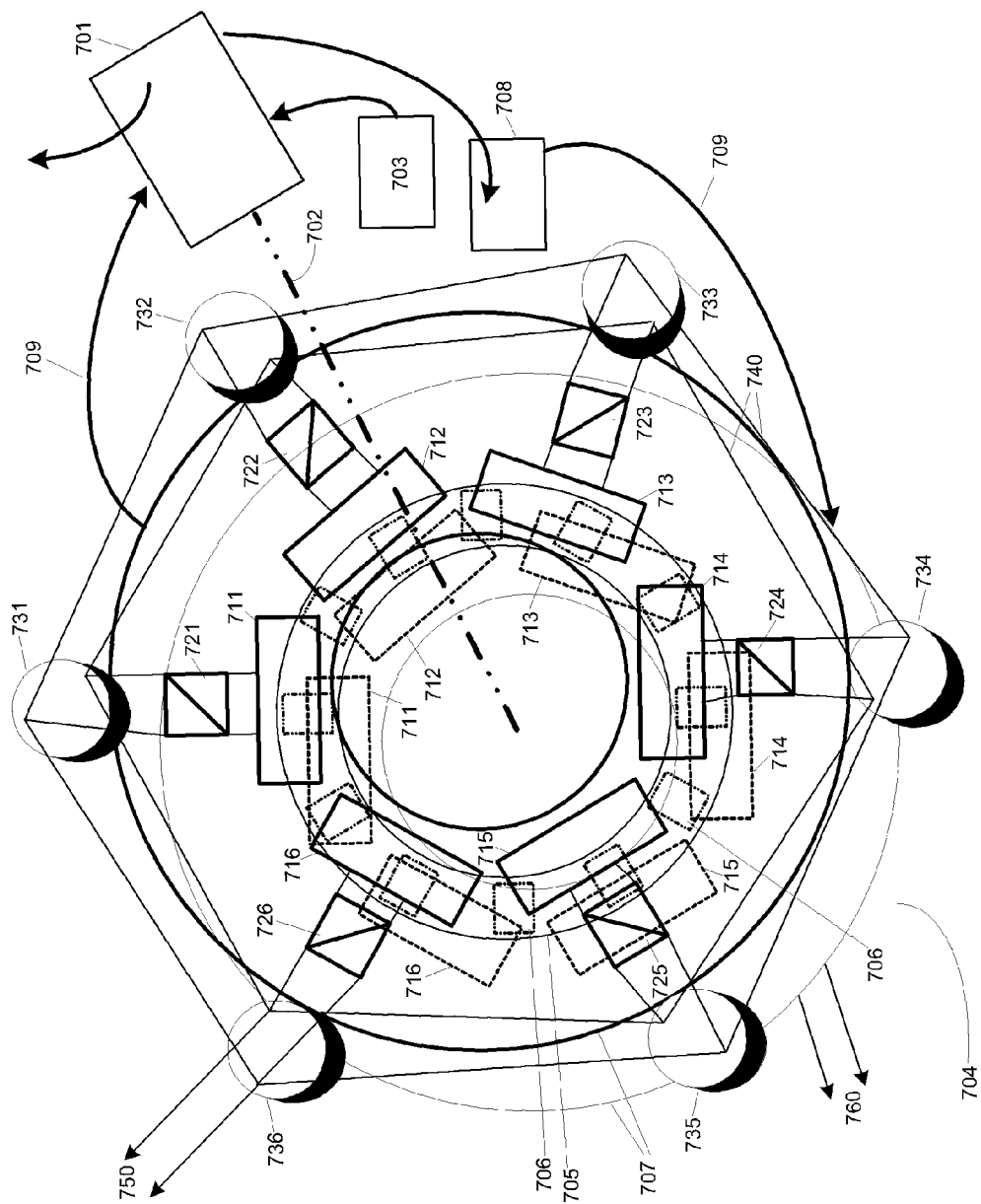
FIG. 7 is a perspective cross-sectional view of a segmented electrical generator/motor machine with distributed electrical energy storage attached to an internal combustion engine for use in an HEV according to an embodiment of the invention.

Referring now to FIG. 7, a perspective cross-sectional view of a segmented electrical generator/motor machine with distributed electrical energy storage attached to an internal combustion engine for use in an HEV according to an embodiment of the invention is shown. Distributed segmented electrical machine 704 includes segmented rotor 705, comprising a plurality of rotor segments 706, between dual segmented stators 707. Dual segmented stators 707 are shown comprising six exemplary pairs of stator segments 711-716, however, in other embodiments, any suitable number of stator segment pairs may be used. Each of the exemplary stator segment pairs 711-716 are preferably substantially magnetically decoupled from other stator segment pairs, and are electrically connected to individual corresponding electrical power drivers 721-726, respectively. The electrical power drivers 721-726 are in turn each electrically connected to individual corresponding electric energy storage systems 731-736, respectively. The individual electric energy storage systems 731-736 may comprise one or more batteries, ultracapacitors, or combinations thereof, for example, or other suitable energy storage means to store electrical energy generated by or consumed by the distributed segmented electrical machine 704. The individual energy storage systems 731-736 are collectively electrically connected by electrical conduits 740 to form a distributed electrical energy storage system. The individual electrical power drivers 721-726 function to convert electrical energy from and/or to individual corresponding stator segment pairs 711-716, as required for the transfer of electrical energy to/from energy storage systems 731-736. The electrical power drivers 721-726 may comprise any suitable power conversion electronics, such as inverters, rectifiers, diode bridges, or combinations thereof, for example.

The segmented rotor 705 of distributed segmented electrical machine 704 may be mechanically attached to ICE 701 such as by means of crankshaft 702, such that the ICE may rotate segmented rotor 705. The distributed segmented electrical machine 704 may therefore be adapted to function as an electrical generator for use in an HEV according to and embodiment of the invention, to convert mechanical energy from ICE 701, powered by fuel stored in fuel storage tank 703, into electrical energy. Such generated electrical energy may be stored in energy storage systems 731-736, and supplied to another electrical machine (such as a driven wheel motor in an HEV) from the energy storage systems 731-736 via electrical conduits 750. Alternatively, electrical energy generated by distributed segmented electrical machine 704 may be supplied directly to another electrical machine via electrical conduits 760, without prior storage in energy storage systems 731-736. An optional central control system (not shown) may be used to control the operation of distributed segmented electrical machine 704, and may be integrated with the machine 704, or located external to the machine 704, such as elsewhere in the HEV. Further, in alternative embodiments, any suitable number of stator segment pairs, distributed power drivers and distributed energy storage systems may be used in the machine 704.

In one embodiment, the distributed segmented electrical machine 704 may be actively cooled such as by circulation of a coolant fluid within or around the electrical machine 704 or components thereof. Optionally, such coolant fluid may be supplied from the ICE 701 and a radiator 708 or other cooling system associated with the ICE 701, by means of coolant conduits 709.

In distributed segmented electrical machine 704, the distribution of power driver and energy storage system functionality to multiple individual power drivers 721-726 and multiple individual energy storage systems 731-736 physically distributed around the machine 704 and co-located in proximity to corresponding individual stator segments 711-716 may desirably increase the reliability and fault tolerance of the distributed segmented electrical machine 704. In inventive machine 704, a fault in or damage to one stator segment pair or power driver, or energy storage system may be isolated from and not affect the operation of the remaining components in the machine 704. This is in contrast to conventional HEV electrical systems typically utilizing a single centralized power driver system, and single centralized energy storage system, where any fault or damage to the single power driver or energy storage system may affect or disable the electrical generation and storage functionality of the entire electrical machine, or entire HEV. Therefore, the physical and electrical distribution of electrical power system functionality (such as power drivers and energy storage systems) within or in association with the electrical machine 704, particularly when combined with the segmentation of the stator of the machine 704, may desirably provide increased fault tolerance and reliability for application to an HEV electrical power system.

The distribution of energy storage systems 731-736 in distributed segmented electrical machine 704 may also provide additional benefits to reliability of the machine 704. The replacement of a single large energy storage system with a distributed multiplicity of smaller energy storage systems 731-736 may provide additional reliability benefits, particularly for certain types of energy storage technology. For example, in the case of rechargeable battery energy storage technology, the use of lithium ion battery technology may be attractive for energy storage in HEVs, due to the high energy storage density of lithium ion technology relative to most other battery technologies. However, large lithium ion battery packs are known to suffer from susceptibility to thermal faults, such as thermal runaway, due to the complexity and volatility of lithium ion battery chemistry. Such thermal faults such as thermal runaway can damage or destroy an entire lithium ion battery pack, which could be catastrophic for an HEV propulsion system if a single centralized lithium ion battery were destroyed. However, the distribution of multiple smaller energy storage systems 731-736 in inventive distributed segmented electrical machine 704 may allow for the use of smaller lithium ion battery packs, which may be more effectively cooled than a single large pack, and may also be thermally isolated from the other distributed battery packs, leading to less heat buildup, and lessened risk of thermal damage, should one battery pack overheat. Additionally, the multiple distributed energy storage systems 731-736 of the inventive distributed segmented electrical machine 704 may also provide for advantageous application of combination energy storage system technologies, such as the particularly attractive combination of a lithium ion battery with high energy storage density, with an ultracapacitor (such as are available from Maxwell Technologies of San Diego, Calif.), which may be impractical for conventional HEV applications requiring a single large energy storage system.

Figure 8:
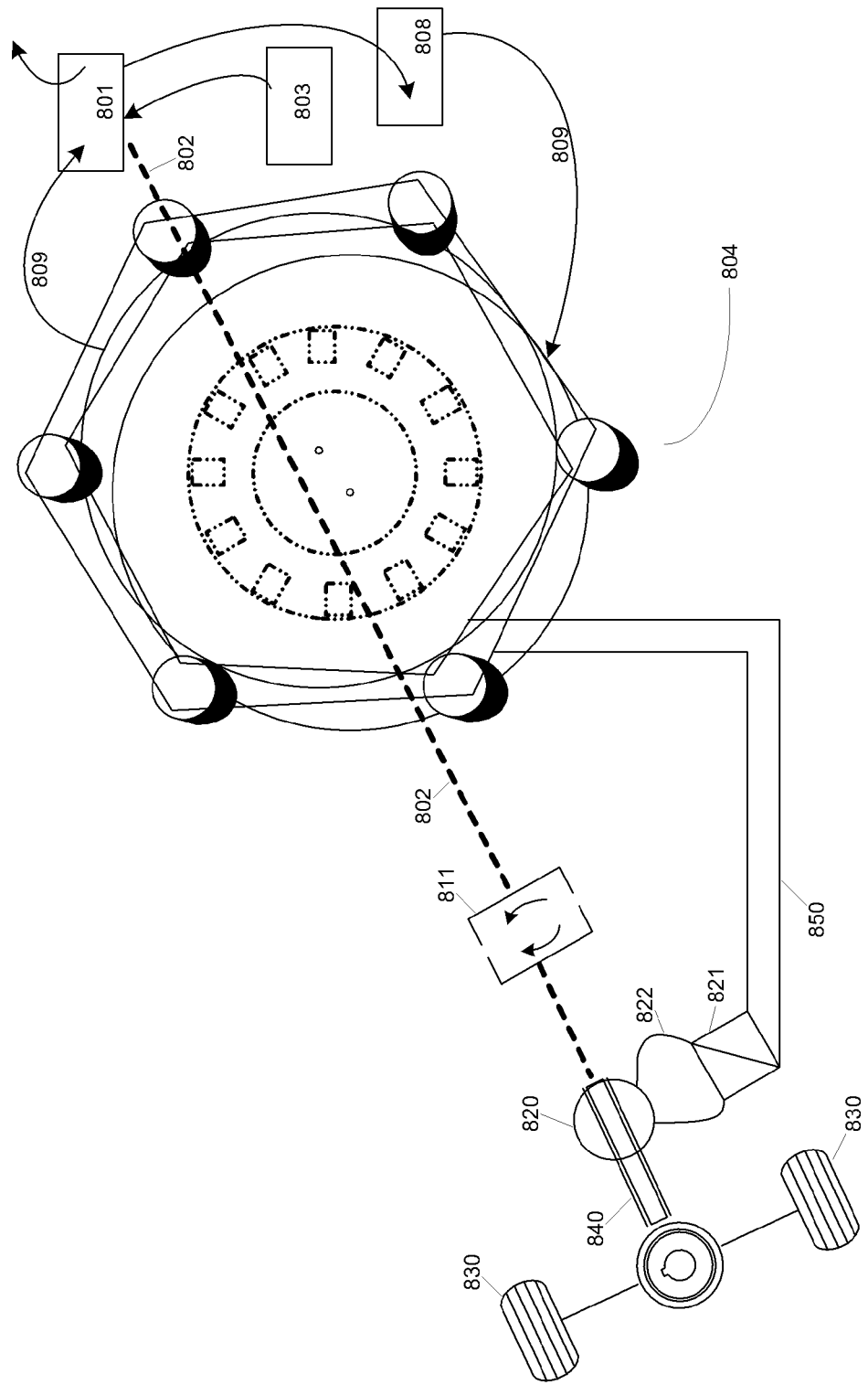
FIG. 8 is a schematic representation of an HEV system configuration with a segmented electrical generator/motor machine with distributed electrical energy storage according to an embodiment of the invention.

Referring now to FIG. 8, a schematic representation of an HEV power system configuration with a segmented electrical generator/motor machine with distributed electrical energy storage according to an embodiment of the invention is shown. The power system comprises a thermodynamic engine powered by a fuel, such as exemplary internal combustion engine 801 which is powered by fuel from a fuel storage tank 803, which is mechanically connected to and drives a distributed segmented electrical generator/motor machine 804, which is essentially similar to distributed segmented electrical machine 704 described above. The exemplary ICE 801 is mechanically connected to distributed segmented electrical machine 804 such as by drive shaft 802, or other transmission means, to rotate the segmented rotor of machine 804 to generate electrical energy. The distributed segmented electrical generator/motor 804 includes distributed energy storage means as described above in reference to machine 704, and may be electrically connected to one or more segmented electrical machines such as segmented electrical drive machine 820 by means of electrical power conduits 850 and 822, and motor electronics 821, to provide propulsion power for the HEV. Segmented electrical drive machine 820 is mechanically connected to driven wheels 830 of the HEV, to provide torque to wheels 830 to propel the HEV. The mechanical connection between segmented electrical drive machine 820 and driven wheels 830 may comprise drive shaft 840, or other suitable transmission means. The HEV of FIG. 8 may optionally comprise more than one segmented electrical drive machine 820, wherein each machine is mechanically connected to a set of driven wheels.

In an optional embodiment of the inventive HEV power system of FIG. 8, a secondary mechanical drive power source for driven wheels 830 may be provided, to provide a backup source of drive power for wheels 830 in case of a fault or failure in the electrical power system of the HEV. The secondary mechanical drive power source may comprise a clutch mechanism 811 which may be adapted to optionally connect drive shaft 802 powered by ICE 801, to drive shaft 840 which drives the driven wheels 830 to propel the HEV. Clutch mechanism 811 may comprise any suitable selectively engageable rotational coupling, such as hydraulic, mechanical, spring or any other suitable variety of clutch, for example. The provision for an optional secondary mechanical drive power source for driven wheels 830 may advantageously provide increased reliability of the HEV propulsion system by providing a backup to the already substantial fault tolerance of the segmented electrical machines 804 and 820. In addition, if the segmented generator 804 (or a critical portion thereof such as stator coils or power driver circuitry, for example) is damaged or destroyed and driven wheels 830 are powered by means of the secondary mechanical drive system connected mechanically to ICE 801, the segmented electrical machine 820 may optionally be operated as a backup segmented electrical generator, to provide electrical power for storage in a battery or other electrical storage means of the hybrid power system, or continued operation of the electrical system of the HEV.

In a further optional embodiment of the inventive HEV power system of FIG. 8, the segmented electrical machine 804 may be adapted to power optional electrical loads in addition to the electrical drive machine 820. In military HEV applications, such optional additional electrical loads may comprise mission critical equipment, such as guidance, weapons or other critical electrical systems. Therefore, if segmented electrical drive machine 820, or other electrical systems associated with driven wheels 830 are damaged or destroyed due to operational mishap or enemy attack for example, critical electrical systems (such as weapons or guidance systems, for example) may continue to operate, powered by segmented electrical generator 804, while driven wheels 830 may be powered by the secondary mechanical drive connection to ICE 801, thus maintaining the mobility and operational functionality of the HEV.

In yet a further optional embodiment of the inventive HEV power system of FIG. 8, the distributed segmented electrical machine 804 may be actively cooled such as by circulation of a coolant fluid within or around the electrical machine 804 or components thereof. Optionally, such coolant fluid may be supplied from the ICE 801 and a radiator 808 or other cooling system associated with the ICE 801, by means of coolant conduits 809.

Figure 9:
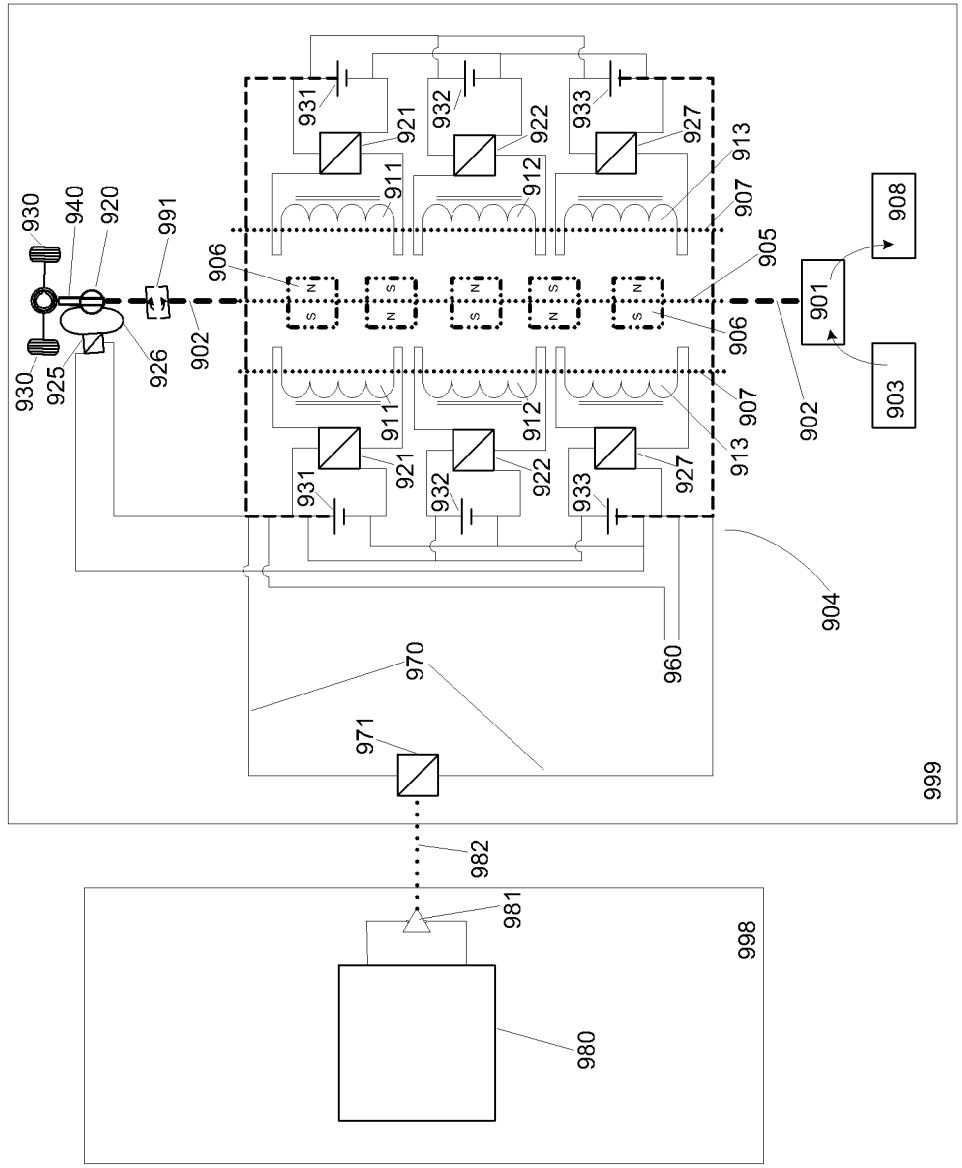
FIG. 9 is a schematic representation of an HEV system configuration with a segmented electrical generator/motor machine with distributed electrical energy storage and an electrical connection to an electrical grid infrastructure, according to an embodiment of the invention.

Referring now to FIG. 9, a schematic representation of an HEV power system configuration adapted for plug-in connection to existing grid or mains power is shown, in accordance with an embodiment of the invention. The HEV power system 999 comprises a thermodynamic engine powered by a fuel, such as exemplary internal combustion engine 901, powered by fuel from a fuel storage tank 903 and cooled by radiator 908, for example. The ICE 901 is mechanically connected to and drives a distributed segmented electrical generator/motor machine 904, which is essentially similar to distributed segmented electrical machines 704 and 804 as described above, to generate electrical energy. The exemplary ICE 901 is mechanically connected to distributed segmented electrical machine 904, such as by drive shaft 902 or other transmission means, to rotate the segmented rotor 905 of machine 904. The distributed segmented electrical generator/motor 904 includes at least one segmented rotor 905 and at least one segmented stator 907. The segmented rotor 905 preferably comprises multiple magnetic rotor segments 906. Preferably, the distributed segmented electrical generator/motor comprises dual segmented stators 907, one on either side of segmented rotor 905. Dual segmented stators 907 comprise multiple pairs of stator segments 911, 912, and 913, which each comprise at least one stator winding. Preferably, each pair of stator segments 911, 912 and 913 are substantially magnetically decoupled from each other pair of stator segments. Each stator segment or pair of stator segments 911, 912 and 913, in the exemplary dual segmented stators 907, is connected via electric power driver circuitry 921, 922 and 927 to a corresponding distributed electrical storage system 931, 932 and 933, which are substantially similar to distributed electrical storage systems 731-736 as described above in reference to machine 704. Each distributed electrical storage system 931, 932 and 933 may comprise one or more batteries, capacitors, or other electrical storage means for example, similar to as described above in reference to storage systems 731-736. In an alternative embodiment, each stator segment in stator segment pairs 911, 912 and 913 may comprise multiple stator windings, such as two coaxially wound stator windings for example, which may also optionally be electrically connected to each other.

The distributed segmented electrical machine 904 may be electrically connected to one or more preferably segmented electrical machines, such as electrical drive machine 920, by means of electrical power conduits 960 and 926 and motor electronics 925, for example, to provide propulsion power for the HEV. Similar to as described above in reference to FIG. 8, electrical drive 920 is mechanically connected to driven wheels 930 of the HEV to provide torque to wheels 930 to propel the HEV, such as by means of a drive shaft 940 and differential, or by other suitable transmission means. The HEV of FIG. 9 may also optionally comprise more than one electrical drive machine 920 to provide torque to one or more sets of driven wheels 930. In an optional embodiment, a secondary mechanical drive power source for driven wheels 930 may be provided, comprising a clutch mechanism 991 which may be adapted to optionally connect drive shaft 902, powered by ICE 901, to drive shaft 940 which drives the driven wheels 930 to propel the HEV. Clutch mechanism 991 may comprise any suitable selectively engageable rotational coupling, such as described above in reference to FIG. 8, to advantageously provide increased reliability of the HEV propulsion system in case of damage to the already substantially fault tolerant segmented electrical machines 904 and 920. Additionally, HEV power system 999 may also typically comprise a separate starter system (not shown) to allow starting of the ICE 901, which may typically comprise a small storage battery and an electric starter motor for example. The starter system battery may preferably be separate from the electrical power storage systems 931-933, so that the ICE 901 may still be started even if the electrical power storage systems 931-933 are in a discharged state.

The HEV power system 999 additionally comprises a hybrid grid converter 971 for connection of the HEV power system 999 to the conventional electrical grid 980 of mains electrical power infrastructure 998. The hybrid grid converter 971 is connected to hybrid segmented generator/motor machine 904 by means of converter power conduits 970, which connect hybrid grid converter 971 to electrical power storage systems 931-933 of hybrid segmented machine 904. Grid electrical power infrastructure 998 is represented by the main electrical grid 980, which may be connected to the HEV power system 999 by means of a hybrid grid connector means 981. The hybrid grid connector 981 may establish an electrical link or connection 982 to the hybrid grid converter 971 of the HEV power system 999 to enable the transfer of electrical energy or power between the grid 980 and HEV system 999.

The electrical link or connection 982 between the grid 980 and HEV system 999 may comprise any suitable resistive, capacitive or inductive type of electrical connection that is operable to transfer electrical energy or power between the grid 980 and the HEV system 999. Accordingly, the grid connector 981 and hybrid grid converter 971 may be adapted to provide one or more of such resistive, capacitive or inductive electrical link or connection 982. In an exemplary simple embodiment, the electrical connection 982 may comprise a resistive power cable to connect the grid connector 981 to the hybrid grid converter 971, in which case the HEV system 999 may be described as a Plug-in Hybrid power system 999, for example. Such a plug-in hybrid electrical connection 982 may be particularly suited to allow for recharging of the electrical storage means 931, 932 and 933 of the HEV power system 999 using electrical energy from the electrical grid 980, when the HEV system is not in use, and is parked at a base station, for example.

In an optional embodiment, the electrical connection 982 between the HEV power system and the electrical grid 980 is bi-directional, such that electrical energy or power may be transferred either from the grid 980 to the HEV system 999, or from the HEV system 999 to the electrical grid 980. In such a case, the hybrid grid converter 971 and grid connector 981 both comprise bi-directional power circuitry to allow for bi-directional electrical power transfer across electrical connection 982. In one mode of such bi-directional power transfer, power from the electrical grid 980 may be transferred to the HEV system 999 to recharge the electrical storage means 931, 932 and 933 of the HEV system without requiring the use of ICE 901 to provide power for recharging. In a second mode of such bi-directional power transfer, power generated by the hybrid segmented generator 904 driven by the ICE 901 may be transferred to the electrical grid 980, such as to provide backup, supplementary and/or auxiliary power capacity to an existing electrical grid infrastructure, for example. Therefore, the HEV power system 999 is operable to provide power to the driven wheels 930 either directly through the ICE 901, the hybrid segmented generator 904, grid power from electrical grid 980 stored in electrical energy storage systems 931-933, or a combination thereof. Alternatively, the HEV power system 999 is also able to provide power to the electrical grid system 980 from either generation by the ICE 901, electrical energy previously stored in storage systems 931-933, or a combination thereof.

Figure 10:
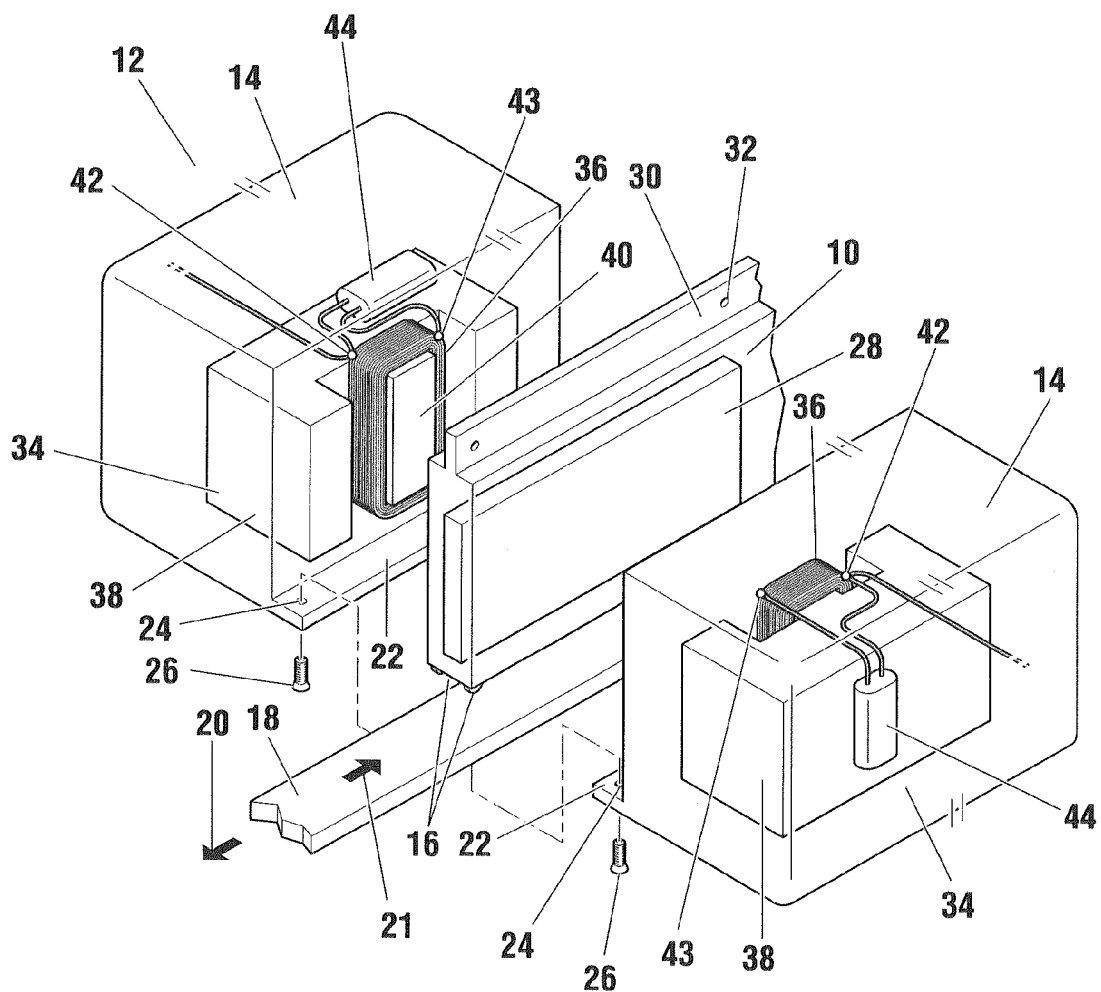
FIG. 10 is a perspective view of a rotor segment disposed between a pair of stator segments and slidably coupled to a support structure, for use in a segmented electrical generator/motor machine for an HEV, according to an embodiment of the invention.

Referring now to FIG. 10, and in accordance with an embodiment of a segmented electrical generator/motor machine according to the invention, a rotor segment 10 is shown disposed between a pair 12 of parallel, spaced apart stator segments 14. Bearings 16 are positioned between the rotor segment 10 and a support structure 18. The bearings 16 permit the rotor segment 10 to move relative to the stator segments 14 in the directions indicated by the arrows 20 and 21. FIG. 10 shows the stator segments 14 unattached to and separated from the support structure 18. However, a stator bracket 22 extends from each stator segment 14 for attaching the stator segment 14 to the support structure 18. The bracket 22 may include apertures 24 for receiving one or more fasteners, such as the fastener 26 shown in FIG. 10, or other fastening techniques or methods may be used to attach the stator segment 14 to the support structure 18. When the stator segments 14 are attached to the support structure 18, the dimensions of the support structure 18 permit the rotor segment 10 to fit between the stator segments 14 without contacting either stator segment 14. In typical applications incorporating the rotor segment 10 and the stator segments 14, which are described further below, the rotor segment 10 fits radially and axially between the stator segments 14.

The rotor segment 10 includes a magnet 28, which is made visible by a cut-out illustrated in FIG. 10 and is preferably a permanent magnet. The magnet 28 is preferably surrounded by a non-magnetic material such as plastic, rubber, encapsulating resin, low friction material, or a combination thereof. The magnet 28 may be encapsulated within the rotor segment 10, including hermetically sealing the magnet 28 within the rotor segment 10. By way of example of encapsulation, a pocket may be formed in the rotor segment 10 for receiving the magnet 28 through an open end of the pocket; a cover may close the open end of the pocket to form an enclosure surrounding the magnet 28; and a vacuum bagging process may be used to seal the cover so as to encapsulate the magnet 28 within the rotor segment 10. However, other encapsulation techniques may be used.

The rotor segment 10 may include means for mechanically connecting the rotor segment 10 to other mechanical components of a rotor assembly. For example, a rotor bracket 30 including rotor bracket apertures 32 may be attached to or formed integrally with the rotor segment 10, as illustrated in FIG. 10. However, other attachment techniques may be used, including threaded recesses in the rotor segment 10 for accepting the end of a threaded fastener, for example.

The rotor segment 10 is depicted in FIG. 10 as having an indefinite length to accommodate a plurality of magnets 28 adjacently arranged and extending generally longitudinally, including being longitudinally offset with respect to each other, within the rotor segment 10. In the exemplary case of a substantially round rotor comprising rotor segment 10, the plurality of magnets 28 may be arranged circumferentially around the rim of the substantially round rotor, including being offset circumferentially with respect to each other. Each magnet 28 is preferably oriented such that a North pole of the magnet 28 is adjacent one stator segment 14 of the pair 12 and a South pole of the magnet 28 opposite the North pole is adjacent the opposing stator segment 14 of the pair 12. Preferably, adjacent magnets 28 within a given rotor segment 10 have opposing orientations such that the polar orientations along each opposing side of the rotor segment 10 alternate between North and South.

Each stator segment 14 includes a stator winding set 34, at least a portion of which is made visible by cut-outs illustrated in FIG. 10. The stator winding set 34 comprises a coil or stator winding 36 and is shown in FIG. 10 as also including a stator core 38 having a projection 40 disposed within the stator winding 36. The stator core 38 is preferably made of a magnetic material, which may be a ferromagnetic material, for increasing the inductance of the stator winding 36. An increased inductance may advantageously permit a greater distance between the magnet 28 and the stator winding 36. In the first embodiment, the stator winding 36 is wound from a single wire having two terminal ends 42 and 43, although a multiple number of wires may additionally be used in each stator winding set 34.

The stator winding set 34 is preferably surrounded by a non-magnetic material such as plastic, rubber, encapsulating resin, low friction material, or a combination thereof, and may be encapsulated within the stator segment 14, including being hermetically sealed within the stator segment 14. A portion of the stator bracket 22 may also be encapsulated within the stator segment 14, and the bracket 22 may be attached to the stator segment 14 by encapsulation thereof. Additionally or alternatively, the bracket 22 may be integral to or formed from the material surrounding the stator winding set 34. The support structure 18 is dimensioned to permit attachment of the stator segments 14 to the support structure 18 such that the rotor segment 10 is permitted to move along the directions 20 and 21.

In the first embodiment, the stator winding set 34 preferably also includes one or more electrical or electronic components electrically connected to the stator winding 36, such as the power factor capacitor 44 electrically connected to the terminal ends 42 and 43 and encapsulated within the stator segment 14. Integrating such one or more electrical components into the stator segment 14 advantageously reduces the complexity and cost of external devices to which the stator segment 14 may be electrically connected.

The one or more electrical components may be located anywhere within the stator segment 14. By way of example, FIG. 10 shows one power factor capacitor 44 beside the stator core 38 opposite the stator winding 36, and one power factor capacitor 44 beside the stator core 38 at one end of the stator winding 36. Other positions for the power factor capacitor 44 or other electrical or electronic components disposed within the stator segment 14 are possible.

The power factor capacitor 44 may be any capacitor compatible with alternating current (AC) power and having a voltage rating sufficiently high to ensure reliable performance. For example, the power factor capacitor 44 may be an electrolytic capacitor, including a dry electrolytic capacitor. Capacitors including liquid electrolyte in sufficient quantities to harm the encapsulation material of the stator segment 14 if leaked are preferably not used. Integrating the power factor capacitor 44 into a given stator segment 14 may advantageously reduce electrical power loss between the stator segment 14 and external devices to which the stator segment 14 may be electrically connected.

The stator segment 14 is depicted in FIG. 10 as having an indefinite length to accommodate a plurality of stator winding sets 34, adjacently arranged and extending generally longitudinally, including being longitudinally offset with respect to each other, within the stator segment 14. In the exemplary case of a substantially round stator comprising stator segment 14, the plurality of stator winding sets 34 may be arranged circumferentially around the rim of the substantially round stator, including being offset circumferentially with respect to each other. The stator windings 36 of different stator winding sets 34 are preferably at least substantially magnetically decoupled from each other, and from any other stator segment pairs. Different stator winding sets 34, and different stator windings 36, may be electrically connected to each other, such as being connected in series or in parallel, for example.

Magnetically decoupling stator windings 36 of different stator winding sets 34 advantageously focuses, or confines, the magnetic flux density lines induced by the rotor segment 10 substantially within the pair of E-shaped stator segments 38 and reduces or eliminates sensitivity in embodiments of the invention to changes in material and material type located between decoupled stator windings 36, including reducing or eliminating sensitivity to changes in the dielectric of materials located between decoupled stator windings 36, thereby enhancing the effectiveness of embodiments of the invention when used in a variety of different environments. Accordingly, during fault conditions, such as limited or zero insulation resistance between one or more magnetically decoupled stator windings 36 and the environment (e.g. electrical ground), a minimal impact on total output voltage and total output power is achieved. Magnetically decoupling stator windings 36 of different stator winding sets 34 also advantageously minimizes insulation requirements for conductors forming electrical connections in segmented electrical machines and systems incorporating them.

When the stator segments 14 are attached to the support structure 18 and the rotor segment 10 moves between the stator segments 14 in either direction 20 or 21 along the support structure 18, an electrical current is induced in the stator windings 36, thereby generating electrical power from mechanical motion. If an electrical current is passed through the stator windings 36 in a given direction, a magnetic force operates on the magnet 28 to urge movement of the rotor segment 10 in a corresponding direction, such as direction 20 for example. An electrical current passing through the stator windings 36 in the opposite direction urges movement of the rotor segment 10 in the opposite direction, such as direction 21 for example. Thus, the segmented electrical machine may be operable as a generator and a motor. Reference herein to a generator will be understood to include reference to a motor.

Figure 11:
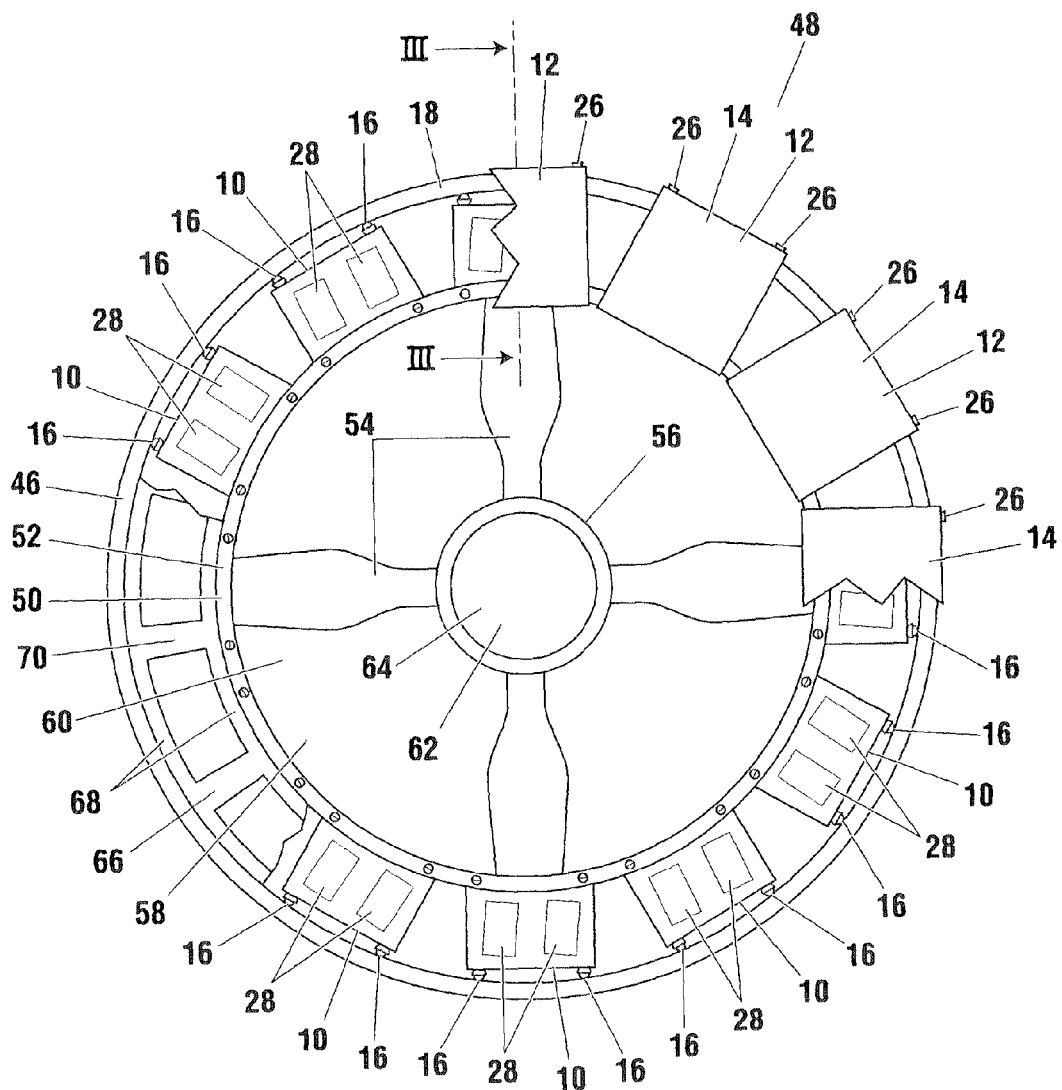
FIG. 11 is a front view of a segmented electrical generator/motor machine incorporating the rotor segment and the pair of stator segments shown in FIG. 10 for use in an HEV according to an embodiment of the invention.
Figure 12:
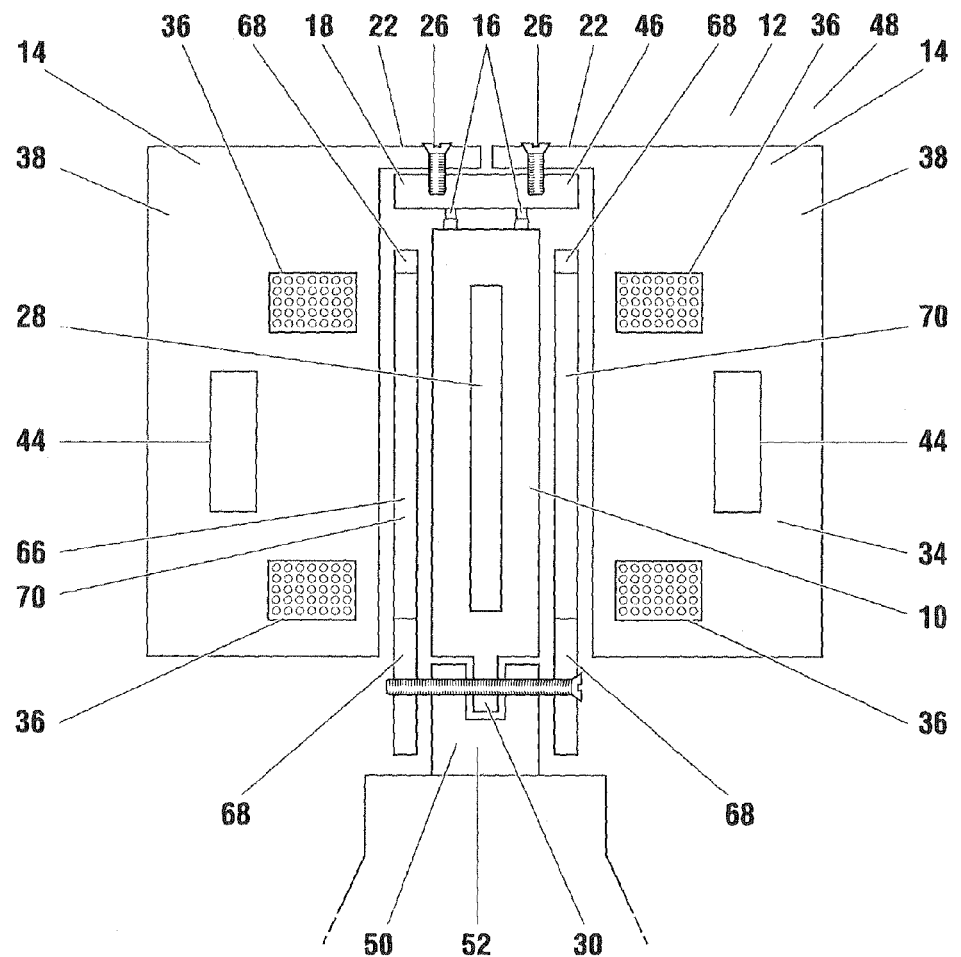
FIG. 12 is a sectional view of the segmented electrical generator/motor machine shown in FIG. 11 along lines showing the rotor segment disposed between the pair of stator segments.

Referring to FIGS. 11 and 12, the support structure 18, by way of an exemplary use of the rotor segment 10 and the stator segment 14, is a rim 46. The rim 46 and other components described further below form a rim generator 48 for generating electricity. Alternatively, the support structure 18 may comprise a hub or a shaft, forming a hub or shaft generator, such as may be mechanically connected to a drive shaft of other propulsion or power system component in an HEV, for example. The generator 48 may be suitably used to generate AC or direct current (DC) electrical power from rotation of the rotor by any suitable mechanical source of power, such as an ICE or drive shaft connected to rotating driven wheels, for example. The generator 48 may also function as a motor and may suitably be used to drive a mechanical load, such as to provide torque for propulsion to driven wheels of an HEV, or to turn the crankshaft of an ICE to start the engine, for example.

The generator 48 as illustrated includes a plurality of rotor segments 10 slidably coupled to the rim 46 by bearings 16, and a plurality of pairs 12 of stator segments 14 attached to the rim 46 by fasteners 26. For each pair 12 of stator segments 14, only one stator segment 14 is visible in FIG. 11. FIG. 12 shows a cross-section of a portion of the rim generator 48 along lines of the rim generator 48 shown in FIG. 11.

It is understood that the number of rotor segments 10 and pairs 12 of stator segments 14 shown in FIGS. 11 and 12 is merely illustrative of one embodiment of the present invention. The Figures described herein are not necessarily drawn to scale.

In the exemplary segmented electrical machine illustrated in FIGS. 11 and 12, each rotor segment 10 is attached to an annular ring 50 to form an annular rotor 52. One or more blades or spokes 54 may be attached to the annular ring 50 at its inwardly facing side while the remaining area inside ring 50 remains as open central space 60, or alternatively, the rotor segments may be attached to a solid or disc-like rotor structure (not shown). Hub 56 may be located at the center of the rotor 52, and may optionally have an open center 62. In one embodiment, the open central space 60 and open hub center 62 may allow flows 58 and 64 respectively of a cooling fluid to flow through the center of the rotor segment 10 to provide cooling. A mechanical component, such as a drive shaft for example, may be attached to the hub 56, to cause the rotor 52 to rotate, resulting in the movement of the rotor segments 10 past the stator segments 14 to generate electricity in the manner previously described herein.

The segmented nature of the rotor 52 advantageously facilitates manufacturing, transportation and assembly of the segmented electrical machine by permitting the rotor segments 10 to be individually manufactured and tested before assembly. Similarly, the stator segments 14 can be manufactured, tested and assembled individually. Furthermore, maintenance and repair of the segmented electrical machine is facilitated by the possibility of removing, installing and/or replacing individual rotor segments 10 and/or individual stator segments 14. The segmented nature of the rotor segment 10 and stator segment 14 components advantageously facilitates assembling a generator and/or motor having a desired distance between the magnets 28 and the stator windings 36, thereby advantageously permitting the distance between the magnets 28 and the stator windings 36 to be selected for optimal energy efficiency. Also, according to one embodiment, distances between rotor segments 10 on rotor 52 may be advantageously selected by providing inter-segment spaces 66 and 70 between adjacent rotor segments 10. The location of rotor segments 10 in relation to the inner and outer rim of rotor 52 may similarly be advantageously selected by providing annular spaces 68 between rotor segments 10 and the inner and outer rims of the rotor 52.

The segmented nature of the rotor 52 advantageously facilitates the manufacturing, transportation and assembly of large diameter generators and motors, including generators and motors having one or more rotors 52 whose diameters are greater than approximately one (1) meter (approximately 3 feet, 3 inches), which may be desirable in some HEV systems, such as for large vehicles.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A hybrid electric power system for powering a multi-wheeled hybrid electric vehicle comprising:
    a thermodynamic engine powered by a fuel, said engine mechanically connected to drive a first electrical machine;
    a second electrical machine adapted to drive at least one driven wheel of said vehicle; and
    at least one electrical energy storage system operable to store electrical energy generated by at least one of said first or second electrical machines;
    wherein at least one of said first and second electrical machines is a segmented electrical machine comprising:
        (a) a plurality of pairs of stator segments, each said pair comprising first and second stator segments, each first and second stator segment of each said pair comprising at least one stator winding; and
        (b) a rotor segment comprising at least one magnet;
    wherein each of said pairs of stator segments are physically separate from and substantially magnetically decoupled from each other of said pair of stator segments.

2. The hybrid electric power system according to claim 1, wherein each said pair of stator segments are substantially parallel and spaced apart, and further comprising said rotor segment slidably coupled between said first and second stator segments of each pair.

3. The hybrid electric power system according to claim 1, wherein said at least one segmented electrical machine comprises a distributed segmented electrical machine additionally comprising:
    (a) a plurality of stator segment groups, each said stator segment group comprising one or more interconnected pairs of said stator segments; and
    (b) a plurality of electrical energy storage systems, wherein each said electrical energy storage system is electrically connected to a corresponding stator segment group and is operable to store electrical energy generated by said corresponding stator segment group.

4. The hybrid electric power system according to claim 3, additionally comprising a plurality of electrical power driver circuits, wherein each said electrical power driver circuit is electrically connected to a corresponding electrical energy storage system and is operable to convert electrical energy generated by a corresponding stator segment group for storage in said corresponding electrical energy storage system.

5. The hybrid electric power system according to claim 4, wherein each said electrical power driver circuit comprises at least one of: a rectifier, an inverter and a diode bridge.

6. The hybrid electric power system according to claim 1 wherein said at least one electrical energy storage system comprises at least one of: a lead acid battery, a nickel cadmium battery, a nickel metal hydride battery, a lithium ion battery, a lithium polymer battery and an ultracapacitor.

7. The hybrid electric power system according to claim 1, wherein said stator windings of each said first and second stator segments are electrically connected.

8. The hybrid electric power system according to claim 1 additionally comprising a hybrid grid converter operable for electrical connection of said hybrid electric power system to an electrical grid infrastructure, and wherein said hybrid grid converter is bi-directional and operable to transfer electrical energy to or from said electrical grid infrastructure.

9. The hybrid electric power system according to claim 8, wherein said electrical connection comprises one of: a resistive, inductive or capacitive electrical connection operable for transfer of electrical energy. or an electrical cable operable for plugging into an electrical grid power outlet.

10. The hybrid electric power system according to claim 1 wherein said rotor segment comprises one of: a permanent magnet and an inductive electromagnet, and wherein each said stator segment comprises a stator core operable to support said stator winding.

11. The hybrid electric power system according to claim 10, wherein each said stator core is substantially E-shaped.

12. The hybrid electric power system according to claim 1, wherein each said stator segment is substantially thermally decoupled from each other of said stator segments.

13. The hybrid electric power system according to claim 1, wherein at least one of:
each said stator segment and said rotor segment are encapsulated in an encapsulating material.

14. The hybrid electric power system according to claim 1, additionally comprising a selectively engageable clutch operable to selectively mechanically connect said thermodynamic engine to drive at least one driven wheel of said vehicle.

15. The hybrid electric power system according to claim 1, wherein said plurality of first stator segments are mounted to a first structural plate, and said plurality of second stator segments are mounted to a second structural plate, and wherein said first and second structural plates are operable to provide cooling to said plurality of first and second stator segments, respectively.

16. A hybrid electric power system for powering a marine hybrid electric vehicle comprising at least one water propulsion means, said hybrid electric power system comprising:
a thermodynamic engine powered by a fuel, said engine mechanically connected to drive a first electrical machine;
a second electrical machine adapted to drive at least one water propulsion means of said marine hybrid electric vehicle;
wherein at least one of said first and second electrical machines is a segmented electrical machine comprising:
(a) a plurality of pairs of stator segments, each said pair comprising first and second stator segments, each first and second stator segment of each said pair comprising at least one stator winding; and
(b) a rotor segment comprising at least one magnet;
wherein each of said pairs of stator segments are physically separate from and substantially magnetically decoupled from each other of said pair of stator segments.

17. The hybrid electric power system according to claim 16, wherein said each pair of stator segments are substantially parallel and spaced apart, and further comprising said rotor segment slidably coupled between said first and second stator segments of each pair, and wherein said stator windings of each said first and second stator segments are electrically connected.

18. The hybrid electric power system according to claim 16, wherein said at least one segmented electrical machine comprises a distributed segmented electrical machine additionally comprising:
(a) a plurality of stator segment groups, each said stator segment group comprising one or more interconnected pairs of said stator segments; and
(b) a plurality of electrical energy storage systems, wherein each said electrical energy storage system is electrically connected to a corresponding stator segment group and is operable to store electrical energy generated by said corresponding stator segment group.

19. The hybrid electric power system according to claim 16 wherein said water propulsion means comprises at least one of: a propeller, a water jet, and an air fan.

20. The hybrid electric power system according to claim 16 additionally comprising a hybrid grid converter operable for electrical connection of said hybrid electric power system to an electrical grid infrastructure, and wherein said hybrid grid converter is bi-directional and operable to transfer electrical energy to or from said electrical grid infrastructure.

\* \* \* \* \*